United States Patent [19]

Sorensen et al.

[11] Patent Number: 5,791,747
[45] Date of Patent: Aug. 11, 1998

[54] HYDRAULIC VALVE CONTROL UNIT FOR VEHICULAR ANTI-LOCK BRAKE AND TRACTION CONTROL SYSTEMS

[75] Inventors: Ronald L. Sorensen, Erie; Gary R. Knight, Woodhaven, both of Mich.

[73] Assignee: Kelsey-Hayes Company, Livonia, Mich.

[21] Appl. No.: 798,966

[22] Filed: Feb. 11, 1997

Related U.S. Application Data

[60] Provisional application No. 60/002,011 Aug. 7, 1995.

[63] Continuation-in-part of Ser. No. 692,483, Aug. 6, 1996, which is a continuation-in-part of Ser. No. 511,900, Aug. 7, 1995, abandoned, and a continuation-in-part of Ser. No. 511,973, Aug. 7, 1995, Pat. No. 5,681,097, said Ser. No. 511,900, and Ser. No. 511,973, each is a continuation-in-part of Ser. No.198,365, Feb. 18, 1994, Pat. No. 5,439,279.

[51] Int. Cl.$^6$ .................... F16K 31/06; B60T 8/36
[52] U.S. Cl. .................... 303/119.2; 137/452.2; 251/129.02; 251/129.15
[58] Field of Search .................... 303/119.1, 119.2, 303/84.2; 137/452.2; 251/129.02, 129.15

[56] References Cited

U.S. PATENT DOCUMENTS

| | | | |
|---|---|---|---|
| 4,828,335 | 5/1989 | Fuller et al. | 303/119.2 X |
| 5,102,096 | 4/1992 | Siegel et al. | 251/129.15 |
| 5,145,149 | 9/1992 | Moehle | 251/129.15 |
| 5,333,836 | 8/1994 | Fukuyo et al. | 303/119.2 X |
| 5,364,067 | 11/1994 | Linkner, Jr. | 251/129.15 X |
| 5,439,279 | 8/1995 | Linkner, Jr. et al. | 251/129.15 X |
| 5,542,755 | 8/1996 | Staib et al. | 303/119.2 |

*Primary Examiner*—Josie Ballato
*Attorney, Agent, or Firm*—MacMillan, Sobanski & Todd

[57] ABSTRACT

A hydraulic valve control unit includes a valve body having an inner end, an outer end, and a fluid passageway. A housing has a bore which receives the inner end of the valve body. A sleeve has an open end which is placed over the outer end of the valve body. An armature is slideably mounted in the sleeve. A coil surrounds the sleeve for selectively moving the armature. A flux ring is disposed between the coil, housing and sleeve. The flux ring secures the sleeve to the valve body. The flux ring has a circumferential groove. A protrusion formed from the housing engages the groove to secure the flux ring, sleeve and valve body to the housing. A method of assembling the hydraulic control unit includes forming a bore in a housing, and inserting an inner end of a valve body into the bore. A sleeve is placed over an outer end of the valve body. A flux ring is pressed between the sleeve and the bore. The flux ring has a circumferential groove with an outer edge having a diameter which is larger than a diameter of the bore. The outer edge of the flux ring shears material from the housing around the bore to form a protrusion which engages the groove and secures the flux ring, sleeve and valve body to the housing. In another embodiment of the invention, a fastener secures at least the flux ring, sleeve and valve body to the housing.

20 Claims, 15 Drawing Sheets

HYDRAULIC VALVE CONTROL UNIT FOR VEHICULAR ANTI-LOCK BRAKE AND TRACTION CONTROL SYSTEMS

CROSS-REFERENCE TO RELATED APPLICATIONS

This is a continuation-in-part of application Ser. No. 08/692,483, filed Aug. 6, 1996, which is a continuation-in-part of application Ser. No. 08/511,900, filed Aug. 7, 1995, abandoned, and a continuation-in-part of application Ser. No. 08/511,973, filed Aug. 7, 1995, now U.S. Pat. No. 5,681,097, and which also claims the benefit of U.S. provisional application 60/002,011, filed Aug. 7, 1995. Each of applications Ser. No. 08/511,900 and Ser. No. 08/511,973 is a continuation-in-part of application Ser. No. 08/198,365, filed Feb. 18, 1994, which issued as U.S. Pat. No. 5,439,279 on Aug. 8, 1995.

BACKGROUND OF THE INVENTION

This invention relates in general to hydraulic valve control units for anti-lock and traction control systems for vehicular applications and, in particular, to the design and method of manufacturing the hydraulic valve control units and the individual solenoid actuated valves embodied in the hydraulic valve control units.

Many automotive vehicles being produced today are equipped with hydraulic brake systems which include anti-lock brake systems (ABS) and traction control (TC) systems. As is known in the art, the anti-lock brake systems inhibit the wheels from locking up during sudden or panic applications of the brake. The traction control system is used to provide engine power to the driven wheel having the highest wheel-to-road friction. The anti-lock brake and traction control systems are considered by many to be the most significant improvement in vehicle safety within the last decade and are presently being offered as standard equipment on many automotive vehicles.

The hydraulic valve portions of most anti-lock brake systems and traction control systems are embodied in a singular compact hydraulic valve control unit, usually in the form of an aluminum block in which there is incorporated the valves and other components necessary to provide the desired anti-lock braking or traction control functions. The hydraulic valve control unit for the anti-lock brake system includes solenoid actuated isolation valves for isolating the wheel brakes from the hydraulic braking force exerted by the master brake cylinder in response to the depression of the vehicle's brake pedal. The hydraulic control unit also includes solenoid actuated hold/dump valves which are activated by an electronic control to dump or reduce the pressure of the hydraulic fluid being applied to the brakes, thereby relaxing the braking torque to prevent wheel lockup. The hydraulic control unit may also include low pressure accumulators and a hydraulic pump to allow fast dumping of the brake pressure and to pump the dumped brake fluid back to the master brake cylinder for subsequent anti-lock cycles of a stop.

The control unit for a traction control system has substantially the same components, which are activated by an electronic control unit to apply a braking torque to the driven wheel of the vehicle which has the lower wheel-to-road friction. By applying a braking torque to the wheel having the lower wheel-to-road friction, the engine torque is directed to the driven wheel having the higher wheel-to-road friction.

The isolation valves, hold/dump valves, accumulators and other components including the electrically driven hydraulic pump are mounted on or in the aluminum block bored as required to receive these components and provide fluid communication passageways between these components as required.

Improved reliability and reductions in weight, size and manufacturing costs of the control unit as well as each hydraulic valve in the control unit are of prime importance. The manufacturing costs are related to the number and complexity of the machining operations and the number and complexity of the assembly operations of each control unit component and the control unit itself.

In the early stages of development of the hydraulic valve control units, typified by the general structure shown in U.S. Pat. No. 4,828,335, assigned to the assignee of the present invention, the solenoid actuated isolation valves and the solenoid actuated solenoid hold/dump valve were threaded into the aluminum block. These valves included a hexagonal-shaped flange to facilitate the rotation of the valve body. This hexagonal-shaped flange is adapted to receive a standard size socket wrench by means of which the valve body can be secured to the aluminum block with sufficient torque to maintain the control valve secure within a threaded bore formed in the aluminum block. The hexagonal flange limited the spacing between the individual solenoid actuated valves such that the size of the aluminum housing was relatively large.

The threaded bores in the aluminum block and the corresponding threaded portion of the valve body were eliminated by Linkner, Jr. in U.S. Pat. No. 5,364,067, assigned to the assignee of the present invention, as shown in FIG. 3 herein. In the control valve taught by Linkner, Jr., the valve body is secured within the bore of the aluminum block by a snap ring. A recessed annular groove is provided in the aluminum block to receive the snap ring. A wave washer resiliently holds a radial flange of the valve body against the snap ring. U.S. Pat. Nos. 4,828,335 and 5,364,067 are hereby referenced as teachings of the prior art.

SUMMARY OF THE INVENTION

The invention relates to a hydraulic valve control unit for vehicular anti-lock brake and traction control systems. The hydraulic valve control unit includes a valve body having an inner end, an outer end, and a fluid passageway. The inner end of the valve body is received inside a bore of a valve body housing. The hydraulic valve control unit further includes a sleeve having an open end which is fitted or pressed about the outer end of the valve body. An armature is slideably mounted inside the sleeve. A flux ring/retainer according to the present invention is slid over the sleeve and pressed into the bore between the sleeve and the valve body housing. In a first embodiment of the invention, the flux ring/retainer has a circumferential groove with an outer edge having a larger diameter than the diameter of the bore. When the flux ring/retainer is pressed into the bore, the outer edge of the groove shears material from the valve body housing around the bore. The sheared material extends from the side of the bore as a protrusion and is forced into the groove. The protrusion engages the groove to secure the flux ring/retainer inside the bore. The flux ring/retainer presses the open end of the sleeve about the outer end of the valve body in a sealing manner. Accordingly, the sleeve does not have to be welded to the valve body. This reduces manufacturing costs by simplifying assembly and reducing the costs of assembly and equipment. A coil is positioned around the sleeve for selectively moving the armature. The flux ring/retainer enhances the strength of the magnetic field of the coil in the vicinity of the armature.

In a second embodiment of the invention, the flux ring/ retainer does not include the groove engaged by a protrusion to secure the flux ring/retainer inside the bore. Rather, a top plate rests on the outer end of the coil, and fasteners such as bolts are connected between the top plate and the valve body housing to secure the coil, flux ring/retainer and valve body to the valve body housing.

The hydraulic valve control unit can be embodied as an isolation valve, a hold/dump valve, or a three-way valve which functions both as an isolation valve and a hold/dump valve. The three-way valve allows construction of a hydraulic valve control unit having further reduced size and weight.

Various objects and advantages of this invention will become apparent to those skilled in the art from the following detailed description of the preferred embodiments, when read in light of the accompanying drawings.

DETAILED DESCRIPTION OF THE PREFERRED EMBODIMENTS

Figure 1:
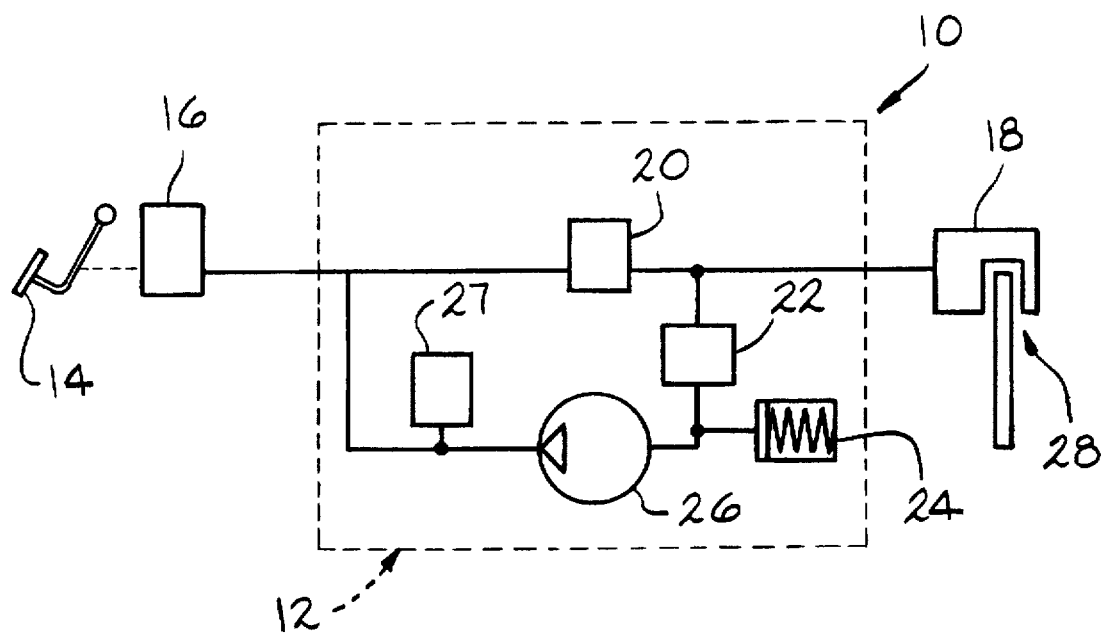
FIG. 1 is a schematic representation of a braking system for an automotive vehicle including an anti-lock hydraulic valve control unit according to the present invention.

A schematic diagram of a braking system 10 for one wheel of an automotive vehicle is illustrated in FIG. 1. The braking system 10 includes a hydraulic control unit 12 formed as a housing containing valve and other components as described below. For purposes of clarity of illustration, only one set of components are illustrated in the schematic representation of FIG. 1. Typically, however, the hydraulic control unit 12 also embodies corresponding components for the other wheels of the vehicle in a well known manner.

The braking system 10 also includes a master brake cylinder 16 responsive to the depression of a brake pedal 14 to provide pressurized brake fluid to a slave cylinder 18 of a wheel brake assembly 28 associated with each wheel of the vehicle. In the embodiment illustrated in FIG. 1, the wheel brake assembly 28 is a disc brake assembly; however, the wheel brake assembly 28 may be a drum brake assembly or any other type of hydraulic brake assembly found on automotive vehicles.

The hydraulic control unit 12 includes normally open isolation valves 20 disposed between the master cylinder 16 and the slave cylinder 18 of the individual brake assemblies 28, at least one low pressure accumulator 24, normally closed hold/dump valves 22 disposed between the slave cylinder 18 of the individual brake assemblies 28 and the low pressure accumulator 24, and a hydraulic pump 26 connected between the low pressure accumulator 24 and the inlet to the isolation valves 20. The control unit 12 may also include an attenuator 27 between the output of the hydraulic pump 26 and the inlet to the isolation valve 20 to limit and smooth fluid flow from the output of the pump 26 back to the master cylinder 16.

During normal braking in the absence of wheel lock-up, the operator of the vehicle depresses the brake pedal 14 causing the master brake cylinder 16 to provide pressurized brake fluid to the brake slave cylinder 18 of the brake assemblies 28 through the normally open isolation valves 20, thereby providing operator controlled braking of the associated wheels (not illustrated).

When a wheel lock-up condition of one or all of the wheels is sensed by an anti-lock electronic brake control sensor (not illustrated), the normally open isolation valves 20 of associated wheels experiencing lock-up conditions are closed to prevent a further increase of the brake fluid pressure being applied to the slave cylinders 18 of the associated wheels. If the lock-up condition of an associated wheel continues, the associated normally closed hold/dump valve 22 is opened as needed, to relieve the pressure of the brake fluid being applied to the slave cylinder 18. The opening of the hold/dump valve 22 allows a predetermined quantity of brake fluid to flow from the slave cylinder 18 into a low pressure accumulator 24. The hydraulic pump 26 pumps the fluid temporarily dumped into the low pressure accumulator 24 back to the inlet side of the isolation valve 20 to maintain the pressure of the brake fluid in the low pressure accumulator 24 at a value less than the pressure being applied to the slave cylinder 18, so that each time the hold/dump valve 22 is opened it will always result in decreasing the pressure being applied to the slave cylinder 18.

Upon the detection of the lock-up condition being terminated, the associated hold/dump valve 22 is closed and the isolation valve 20 is reopened, as needed, to increase the brake fluid pressure being applied to the slave cylinder 18, again maximizing the braking torque applied to the associated wheel.

Figure 2:
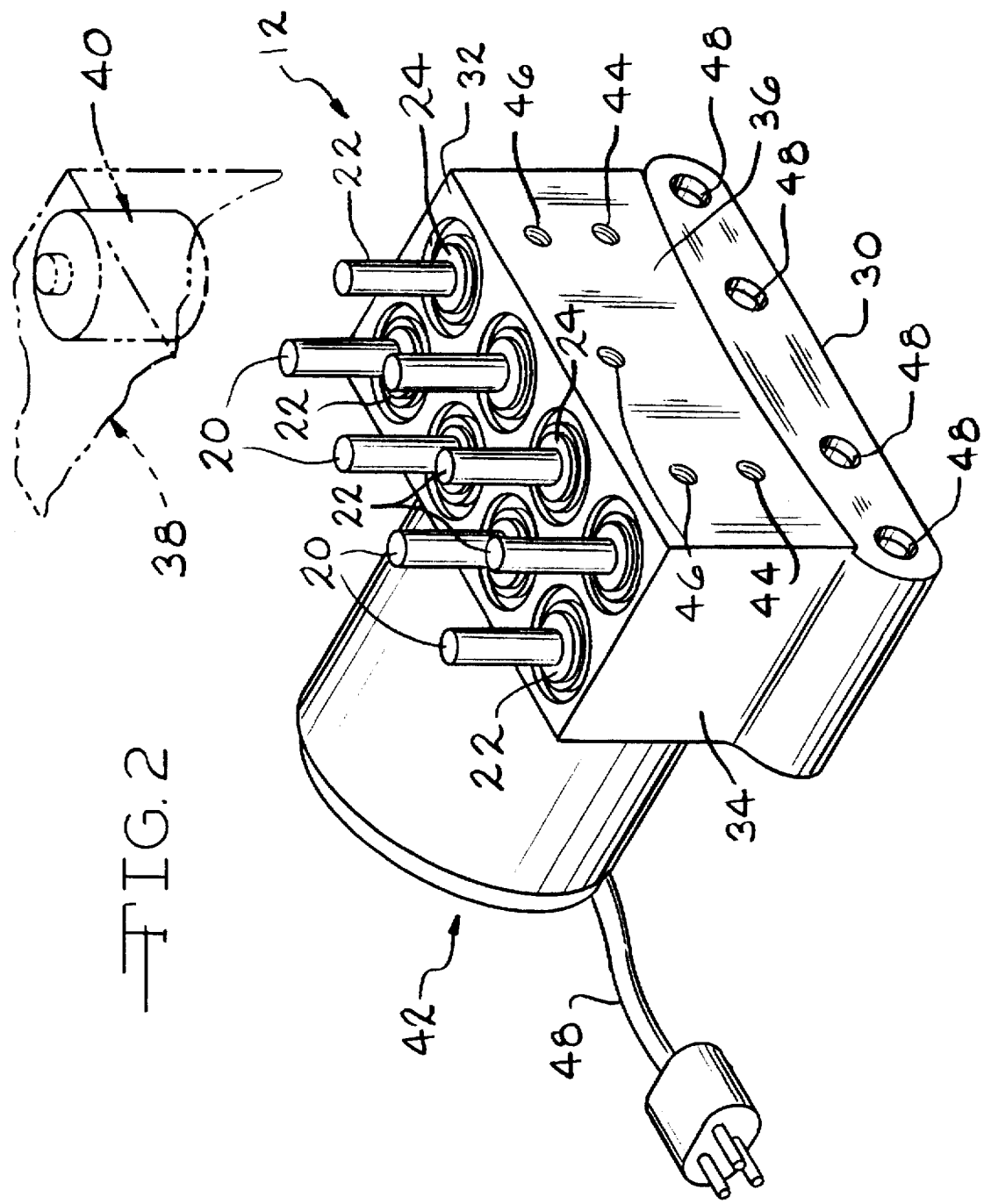
FIG. 2 is a perspective view of an anti-lock hydraulic valve control unit according to the present invention.

The construction of the hydraulic control unit 12 is illustrated in FIG. 2. The control unit 12 consists of a valve body housing 30 having at least wall surfaces 32, 34, and 36 and a coil integrated module (CIM) 38 securable to the valve body housing 30 in final assembly. The valve body housing 30 is preferably made from aluminum but may be made from any other metal or alloy having the desired swaging properties as shall be explained hereinafter. For clarity of illustration, only a portion of the coil integrated module 38 is shown in FIG. 2. The coil integrated module 38 contains a solenoid coil assembly 40 for each of the isolation valves 20 and hold/dump valves 22 required by the anti-lock brake system.

Extending from the wall of the valve body housing 30 opposite the wall surface 36 is an electric motor 42 driving the hydraulic pump 26 enclosed within the valve body housing 30. The electrically driven hydraulic pump 26 pumps the brake fluid from the low pressure accumulator 24, as previously described relative to FIG. 1, to maintain the pressure in the low pressure accumulator 24 below the brake fluid pressure being applied to the slave cylinder 18. Mounted within the valve body housing 30 are a requisite number of isolation valves 20 and hold/dump valves 22. External portions of the valves 20 and 22 which contain an armature (not illustrated in FIG. 2) extend from the wall surface 32. Each external portion is circumscribed by a selected one of the solenoid coil assemblies 40 (only one of which is illustrated in FIG. 2) in the coil integrated module 38. In the preferred embodiment, an individual isolation valve 20 and an individual hold/dump valve 22 is provided in the valve body housing 30 for each wheel of the vehicle to control the brake fluid pressure being applied to the associated slave cylinder 18.

However, in other types of braking systems, such as a crossed diagonal braking system, only a single isolation valve 20 and a single hold/dump valve 22 may be used to control the brake fluid pressure being applied to the slave cylinders 18 for each diagonally opposite pair of wheels. This reduces the number of isolation valves 20 and dump/hold valves 22 in the control unit 12 to two (2) each. Also, in a vertical split braking system, the rear wheels are activated as a pair and only a single isolation valve 20 and single hold/dump valve 22 are used to control the rear wheels in an anti-lock mode of operation.

Returning to embodiment illustrated in FIG. 2, each isolation valve 20 and hold/dump valve 22 associated with a particular wheel are aligned with each other. For example, the isolation and hold/dump valves are aligned with each other perpendicular to the wall surface 36 of the valve body housing 30.

Provided in wall surface 36 of the valve body housing 30 are a pair of threaded apertures 44 which are adapted to receive threaded connectors provided on the end of the hydraulic lines (not shown) which connect the valve body housing 30 to the master cylinder 16. Also provided in wall surface 36 are four threaded apertures 46 which are adapted to receive threaded connectors on the end of the hydraulic lines (not shown) connecting the valve body housing 30 to the individual slave cylinders 18 associated with the brake assemblies of each wheel. The end caps 48 formed in wall surface 36 enclose one end of four low pressure accumulators 24 (not illustrated in FIG. 2) embodied in the valve body housing 30 and two attenuators 27 (not illustrated in FIG. 2). The end caps 48 may be threaded into the valve housing 30 or swaged in place as shall be discussed hereinafter. Likewise, threaded apertures 44 and 46 may be eliminated in favor of a threadless-type connector, including swaging.

Figure 3:
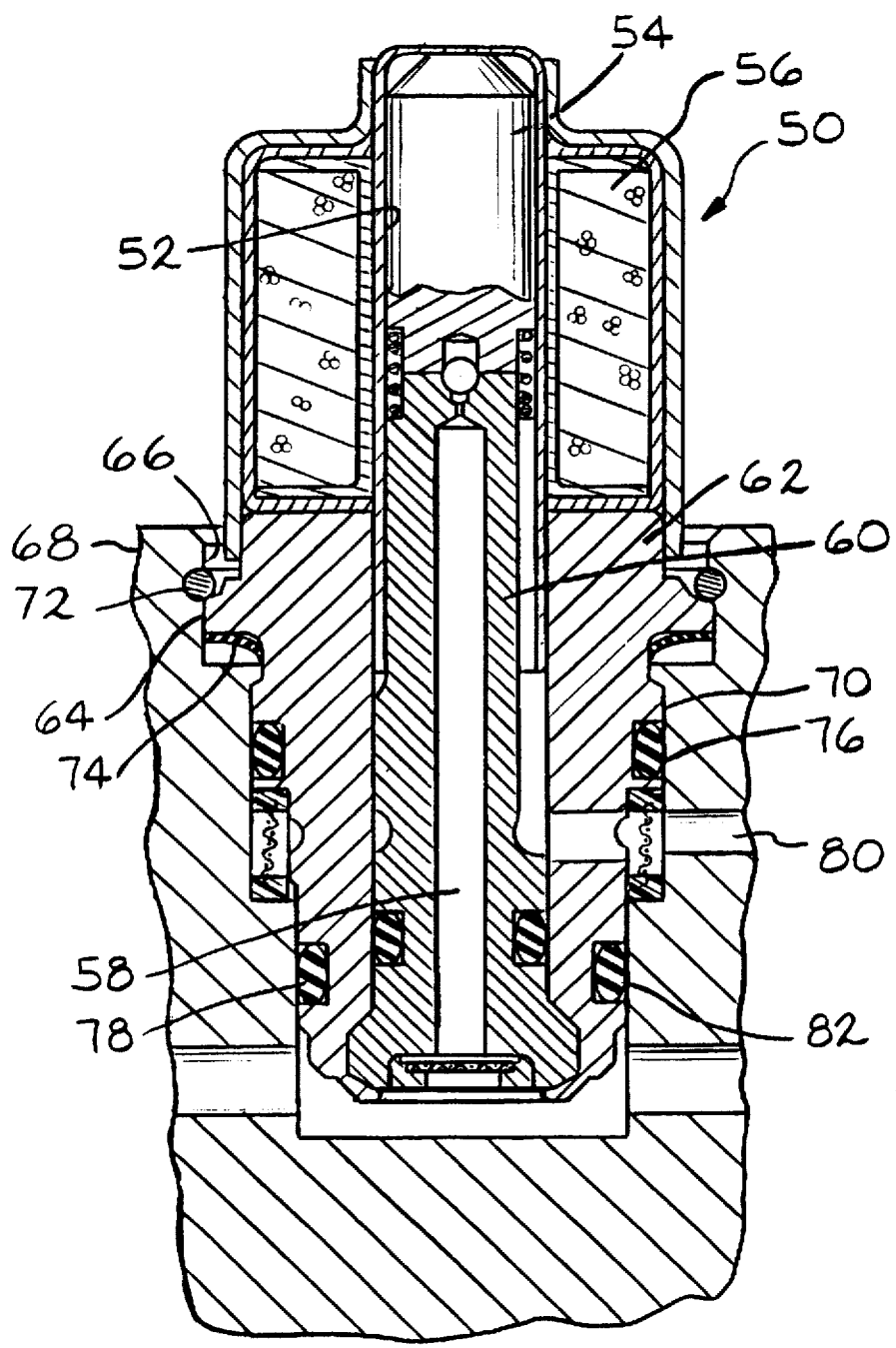
FIG. 3 is a sectional view of a prior art isolation valve for an anti-lock brake system.

FIG. 3 illustrates a sectional view of a prior art isolation valve 50 mounted in a hydraulic control unit such as taught by Linkner, Jr. in U.S. Pat. No. 5,364,067. As is obvious to one skilled in the art, the structure shown in FIG. 3 is equally applicable to hold/dump valves. The prior art isolation valve 50 has a cylindrical sleeve 52 in which a movable armature 54 is slidably received. An annular coil 56 circumscribes the sleeve 52. The armature 54 has a ball valve which engages a valve seat located at one end of a coaxial fluid passage 58 provided through a valve stem 60. The armature 54 is biased away from the valve stem 60 by a spring as shown. The valve stem 60 is locked in a valve body 62 which has a radial flange 64 received through an opening 66 provided in the valve body housing 68. The valve body housing 68 has a valve cavity 70 having an annular recess in which a snap ring 72 is received to inhibit the removal of the valve body 62 from the valve cavity 70. An annular wave washer 74 biases the radial flange 64 against the snap ring 72 to lock the valve body 62 in the valve cavity 70.

Annular fluid seals 76 and 78 are disposed in annular grooves formed in the valve body 62 on opposite sides of an internal passageway 80 provided in the valve body housing 68 which serves as an outlet port while a fluid seal 82 is provided between the valve stem 60 and the valve body 62. As can be seen, the valve cavity 70 has several counterbores and an annular recess which increases the complexity and cost of the machining of both the valve cavity 70 and the valve body 62. Additionally, the assembly of the valve 50 into the valve bore requires two annular seals 76 and 78, a snap ring 72, and a wave washer 74 which increases the assembly complexity, assembly time and cost of the anti-lock braking hydraulic control unit. In addition to the isolation valve 50, the hydraulic control unit may also embody a hold/dump valve, a low pressure accumulator, a pump, and an attenuator in a well known manner.

Figure 4:
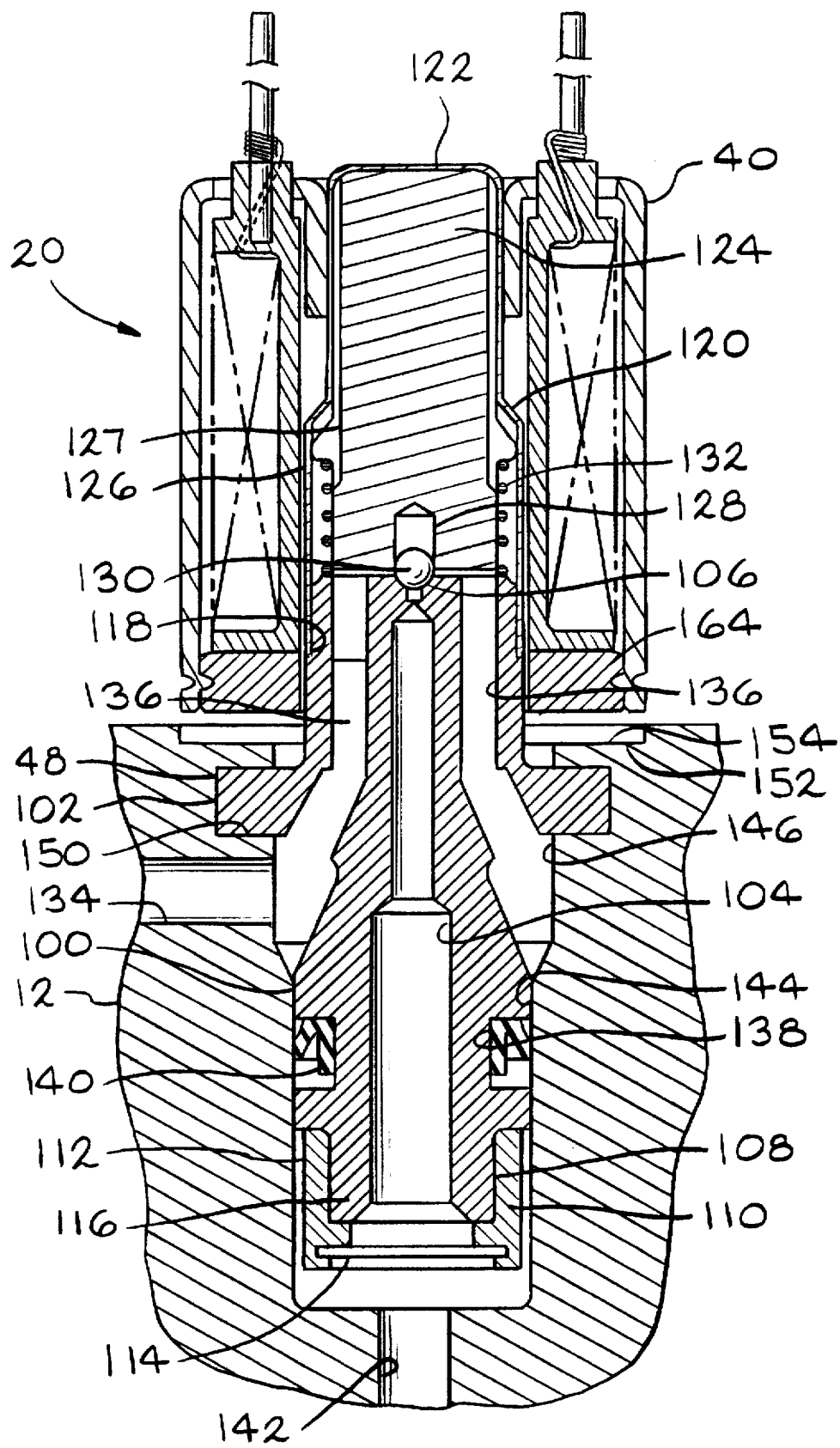
FIG. 4 is a sectional view of an isolation valve according to the present invention.
Figure 7:
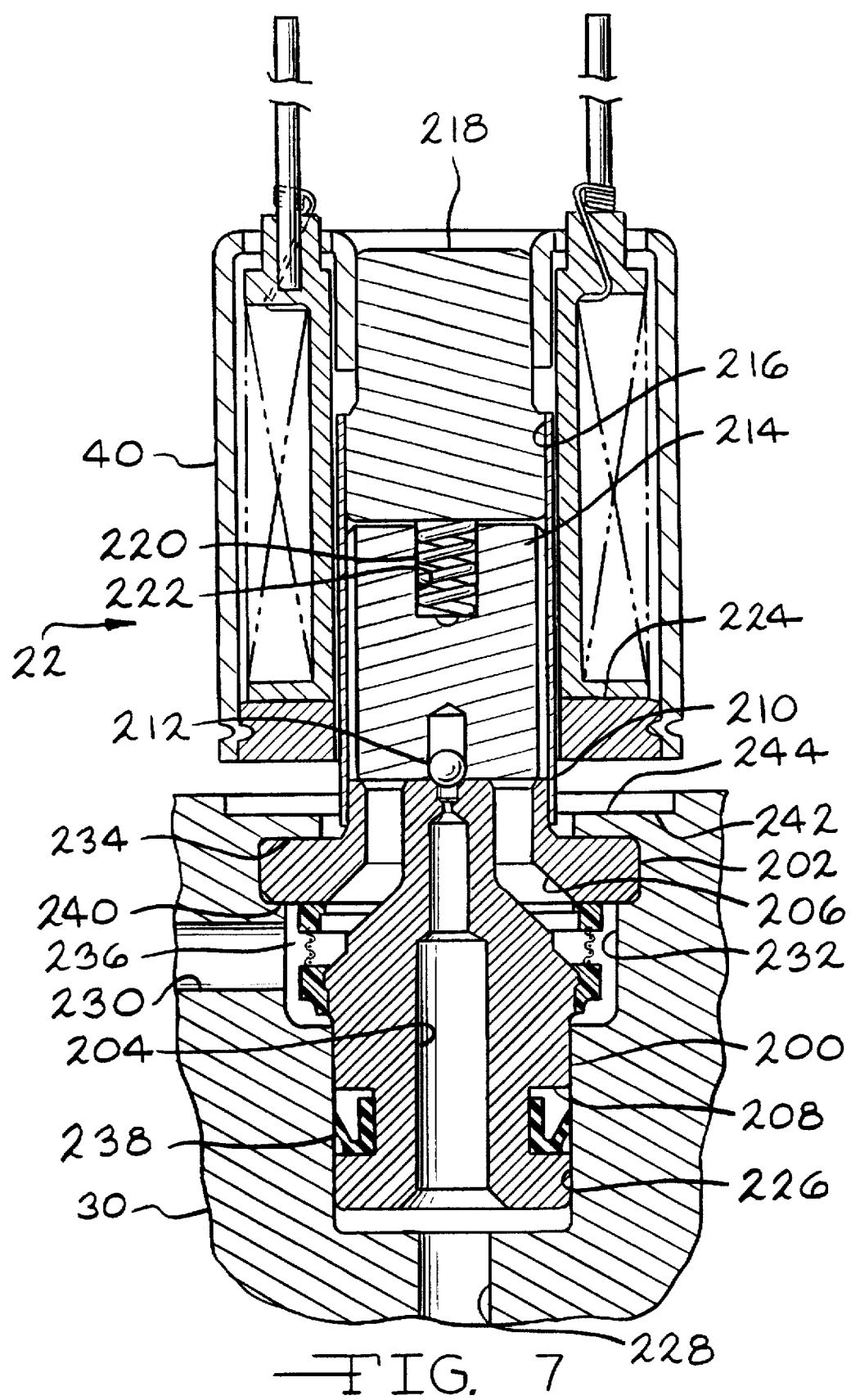
FIG. 7 is a sectional view of a hold/dump valve according to the present invention.

The construction of first preferred embodiments of the isolation valve 20 and a hold/dump valve 22 according to the present invention are illustrated in FIGS. 4, 5 and 7. The design of valves 20 and 22 result in a significant reduction in the machining and assembly operations of the valves themselves and the valve body housing 30. The structure of the isolation valve 20 and its assembly to the valve body housing 30 are shown in FIG. 4. The isolation valve 20 has a cylindrical valve body 100 having a radial flange 102. The valve body 100 has a coaxial flow passage 104 provided therethrough which terminates at its upper end in a conical valve seat 106. The lower end of the valve body 100 has a reduced diameter portion 108 which has an annular catch 110 adjacent to its lower end. A filter assembly 112 having a filter 114 is received over the reduced diameter portion 108 of the valve body 100. The filter assembly 112 has an internal recess 116 in which the annular catch 110 is received to snap lock the filter assembly 112 to the end of the valve body 100 so that the filter 114 covers the lower end of the coaxial flow passage 104.

A cylindrical sleeve 120 has an open lower end and an closed upper end 122. The open end is laser welded to the valve body 100 providing a fluid tight seal therebetween. The valve body 100 has a reduced diameter section 118 over which the open end of the sleeve 120 is received.

An armature 124 is slidably disposed in the sleeve 120. The armature 124 has an annular flange 126 and an axial bore 128 in which is received a valve member sized to engage the valve seat 106 and block the upper end of the coaxial flow passage 104. The valve member is preferably a ball 130. The ball 130 is substantially non-deformable, for example, a steel ball. A coil spring 132 is disposed between the upper end of the valve body 100 and the flange 126 and resiliently biases the armature 124 away from the valve body 100 and the ball 130 away from the valve seat 106. As indicated, the armature 124 and the flange 126 have trough slots 127 providing a fluid passageway between the flange 126 and the closed end 122 of the cylindrical sleeve 100. The slots 127 prevent a fluid lock-up condition inhibiting the rapid displacement of the armature 124 relative to the valve body 100.

A coil assembly such as coil assembly 40 shown in FIG. 2 is slidably received over the cylindrical sleeve 120 with a flux ring 164 being in close fitting, sliding engagement with valve body section 118. Optionally, to accommodate manufacturing tolerances, a slight clearance can be allowed between the flux ring 164 and sleeve 120. The coil assembly 40 is operative, when energized, to produce a magnetic field displacing the armature 124 towards the valve body 100 causing the ball 130 to seat on the valve seat 106. The seating of the ball 130 on the valve seat 106 terminates the fluid flow between the axial fluid inlet passage 104 and an outlet passageway 134 formed in the valve body housing 30 through internal passageways 136 formed in the valve body 100. The outlet fluid passageway 134 is connected to an associated threaded aperture 46 and to the input of the associated hold/dump valve 22 as shown in FIG. 1.

As stated above, the coil assembly 40 includes an annular flux ring 164 disposed at the end adjacent the valve body housing 30. The flux ring 164, such as taught in patent application Ser. No. 08/198,365, assigned to the assignee of the present invention, issuing as U.S. Pat. No. 5,439,279 on Aug. 8, 1995, the disclosure of which is hereby incorporated by reference as a further teaching of the subject matter, enhances the strength of the magnetic field acting on the armature 124 and reduces the current required to produce a magnetic field having a strength sufficient to displace the armature 124 against the force of spring 132.

The valve body 100 further has an annular groove 138 in which is received a one-way seal 140 to prevent a fluid flow from the internal inlet passageway 142 of the valve body housing 30 to the outlet passageway 134. The internal inlet passageway 142 connects to an associated threaded aperture 44, FIG. 2, and to the master brake cylinder 16 and to the output of the pump 16 as shown in FIG. 1.

The valve body housing 30 has a valve cavity 144 for each isolation valve 20 and each hold/dump valve 22 to be mounted therein. The lower or bottom end of the valve cavity 144 has an annular recess 146 provided adjacent to the terminal ends of internal passageways 136 and a counterbore 148 which receives the radial flange 102. Preferably, the diameter of the counterbore 148 is slightly smaller than the diameter of the radial flange 102, typically about 0.05 to 0.15 mm (0.002 to 0.006 in.), producing an interference fit in the radial sealing area of the radial flange 102. The depth of the counterbore 148 is typically about 2.0 mm greater than the thickness of the radial flange 102 so that when the isolation valve 20 is inserted into the valve cavity, the upper surface of the radial flange 102 is approximately 2.0 mm below the adjacent surface of the valve body housing. The diameter of the counter bore 148, however, may be slightly larger than the diameter of the radial flange 102 so that it is not necessary to press the radial flange 102 into the counterbore during assembly. However, such an arrangement would require an additional fluid seal, for example an "O-ring" seal at the underside of flange 102, to augment loss of the fluid seal provided by the press fit radial flange embodiment.

Figure 5A:
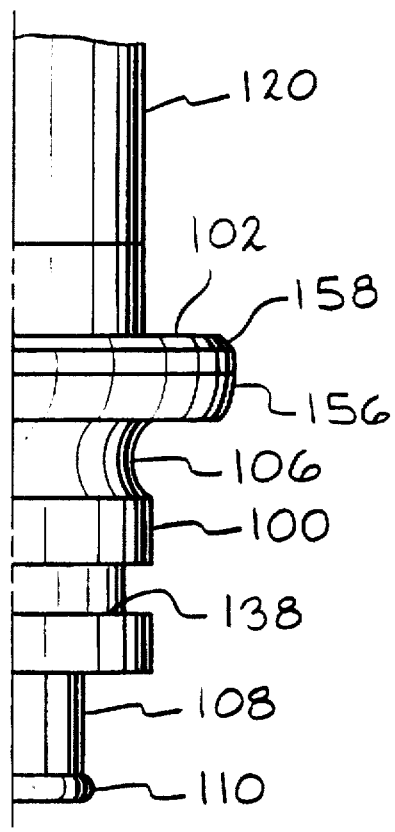
FIG. 5A is an enlarged elevation view of a right half of the valve body of FIG. 4 removed from a hydraulic control unit, wherein a seal and a filter assembly have been removed from the valve body and details of a radial flange are shown.

To facilitate the press fit insertion of the radial flange 102 into the counterbore 148, a portion 156 of the radial flange 102 is tapered at approximately 15° to form a truncated cone as shown in FIG. 5A. This truncated cone permits the radial flange 102 to be properly centered into the counterbore 148, and it reduces the insertion forces required to seat the radial flange 102 on the shoulder 150 formed at the bottom of the counterbore 148 when the radial flange 102 is an interference fit. The upper edge of the radial flange 102 has a beveled edge 158 to increase the shear area and facilitate the sealing of the radial flange 102 in the counterbore 148 as shall be explained hereinafter.

Figure 5B:
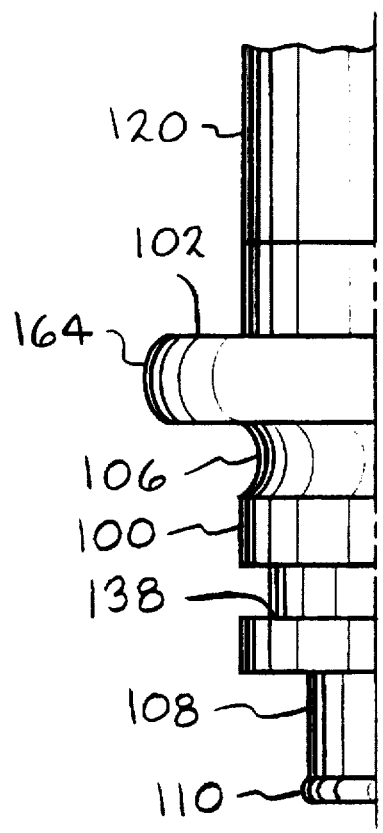
FIG. 5B is a view similar to FIG. 5A illustrating an alternate spherically-shaped surface on the radial flange.

The truncated cone portion 156 is also used to form an interference fit for either primary or secondary fluid pressure sealing. When used for pressure sealing, the shallow 15 degree angle causes any debris, that might be generated at this interference seal area, to be subducted (squeezed into a portion 102 of the interference seal area) rather than be plowed ahead. Alternatively, the truncated cone portion 156 could be replaced by a spherically-shaped surface 164 as shown in FIG. 5B to provide the same centering, sealing, and subducting features.

After the radial flange 102 is seated on the shoulder 150 as shown in FIG. 4, the region 152 of the valve body housing 30 adjacent to the edge of the counterbore 148 is swaged to a depth from 0.4 to 0.8 mm to form a lip 154 over the upper surface of the radial flange 102. The preferred depth of the swaged area is 0.6 mm. The beveled surface 158 facilitates the flow of the metal of the valve body housing 30 over the radial flange 102 during the swaging process. The swaged lip 154 locks the valve body 100 in the valve bore 144 of the valve body housing 30 and produces an excellent fluid tight seal between the outer edge of the radial flange and the valve body housing 30.

Figure 6:
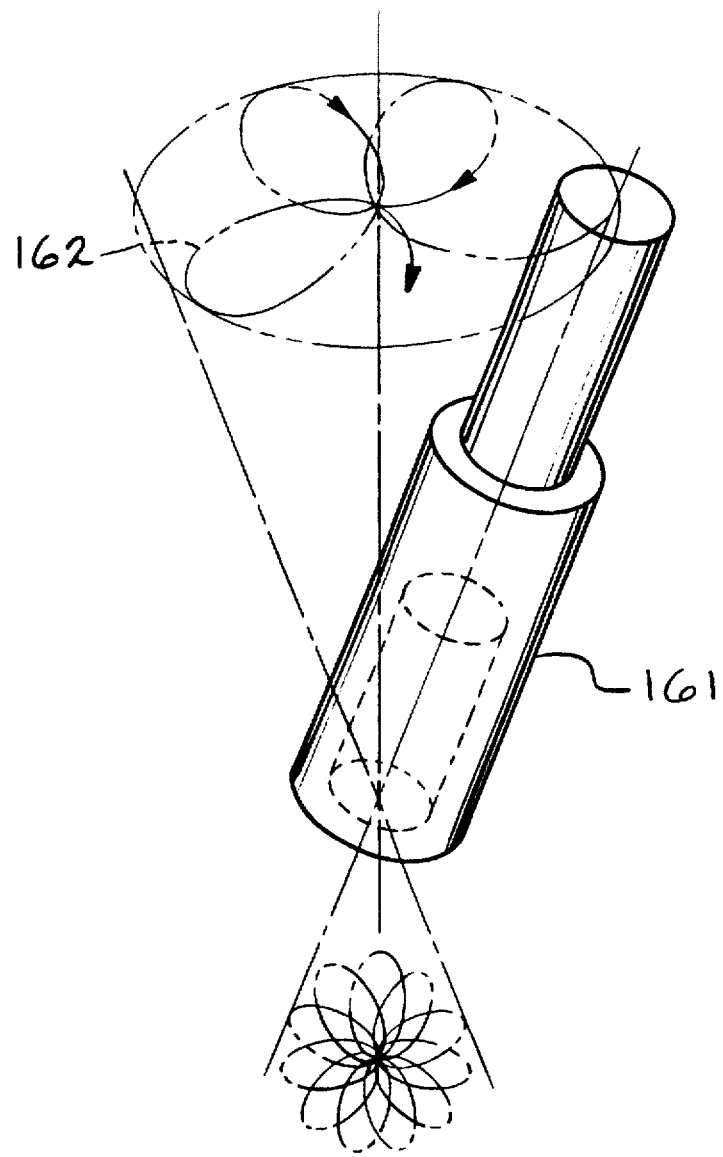
FIG. 6 is a schematic representation of the orbital motion of a swaging tool in a rosette pattern.

Preferably, the lip 154 is swaged using a swaging tool 161 orbited in a rosette pattern 162 as shown in FIG. 6. The movement of the swaging tool 161 in the rosette pattern uniformly swages the lip 154 inwardly over the radial flange 102 as shown in FIG. 4. Preferably, the outer diameter of the swaging tool 161 is 4.0 mm greater than the diameter of the counterbore 148 and the eccentricity of the center line of the swaging tool 161 is within 0.5 mm of the center line of the counterbore 148. This swaging process not only secures the valve body 100 in the valve cavity 144 but also produces an excellent fluid tight seal between the radial flange 102 and the valve body housing 30. During the swaging process, the advance speed of the swaging tool 161 is preferably between 2.0 to 2.8 mm/sec.

Alternatively, the annular lip 154 could be formed with the same swaging tool orbited in a concentric circular orbital pattern rather than in the rosette pattern. This, however, would require higher loading to form the annular lip 154 but would produce lower vibrations.

This same type of swaging process may be used to swage the end caps 48 enclosing the low pressure accumulators and the attenuators in the valve body housing 30, as shown in FIG. 1.

The construction of the hold/dump valve 22 is illustrated in FIG. 7. Hold/dump valve 22 as shown substantially embodies the subject matter of the present invention as discussed above relative to the isolation valve 20 of FIG. 4. The hold/dump valve 22 has a generally cylindrical valve body 200 having a radial flange 202, a coaxial outlet passage 204, an inlet passage 206 and an annular seal groove 208. The coaxial outlet passage 204 has a conical valve seat 210 provided at its upper end which is sealingly engaged by a ball valve 212 attached to an armature 214. The ball 212 is a substantially non-deformable steel ball.

The armature 214 is slidably received in a cylindrical sleeve 216 sealed at one end to the valve body 200 and sealed at the other end to a cylindrically-shaped stationary pole piece 218. In the preferred embodiment, the sleeve 216 is laser welded to the valve body 200 and the pole piece 218 forming a fluid tight seal therebetween. A coil spring 220 received in a spring bore 222 provided in the armature 214 resiliently biases the armature 214 away from pole piece 218 and biases the ball 212 to engage the valve seat 210, thus providing the hold/dump valve 22 with a normally closed state. As would be obvious to those skilled in the art, the spring bore 222 may alternatively be provided in the pole piece 218.

A solenoid coil assembly, such as solenoid coil assembly 40 shown in FIG. 2, is slidably received over the pole piece 218 and the sleeve 216, with the flux ring 164 being in close fitting, sliding engagement with the sleeve 216. Optionally, a slight clearance could be allowed between flux ring 164 and sleeve 216. Coil assembly 40 is operative, when energized, to generate a magnetic field displacing the armature 214 in a direction towards the pole piece 218 disengaging the ball valve 212 from the conical valve seat 210 thus opening a fluid passage from the inlet passage 206 and the coaxial passage 204. As described above, the coil assembly 40 includes an annular flux ring 164 to enhance the strength of the magnetic field in the vicinity of the armature 214.

The valve cavity 226 provided in the valve body housing 30 has a generally cylindrical shape. The valve body housing 30 further has at least an internal outlet passageway 228, an inlet passageway 230, an annular recess 232 adjacent to the terminal ends of the inlet passageways 206, and a counterbore 234. The counterbore 234, is sized to receive the radial flange 202 with a loose fit or an interference fit with the rim of the radial flange 202. Likewise, similar to the radial flange 102 of the isolation valve 20 illustrated in FIG. 5a, the rim of the radial flange 202 preferably has a truncated conical surface corresponding to truncated conical surface 156 and a beveled edge corresponding to the beveled edge 158. The truncated conical surface facilitates the centering of the radial flange 202 in the counterbore 234 and also reduces the force required to insert the valve body 200 into the valve cavity 226 when the counterbore 234 is sized to be an interference fit with the flange 202. An annular filter 236 is received over the valve body 200 with the same snap-fit construction previously described and covers the terminal ends of the inlet passages 206. A one-way seal 238 is disposed in the annular seal groove 208 to prevent a fluid flow from the inlet port 232 to the outlet port 228.

After the radial flange 202 is properly seated on the shoulder 240 formed at the bottom of the counterbore 234, the region 242 of the valve body housing 30 adjacent to the counterbore 234 is swaged to form an annular lip 244 which secures the radial flange 202 to the valve body housing 30. Preferably, the region 242 is swaged using a swaging tool, such as swaging tool 160 shown on FIG. 6, orbited about the edge of the counterbore in a rosette pattern 162 to form the lip 244.

As discussed above relative to the isolation valve 20 shown on FIG. 4, the swaged lip 244 not only secures the valve body 200 to the valve body housing 30 but also may, because of the press fit between the flange 202 and the wall of the counterbore 234, form an excellent primary fluid seal prohibiting the pressurized brake fluid received through the inlet passageway 230 from leaking past the radial flange without the need for a separate O-ring seal at this interface.

The use of a separate flux ring 164 as part of the coil assembly 40 facilitates downsizing of the valves and thus the valve body bores. Further, it facilitates the swaging or other non-threaded connection of the isolation and hold/dump valves to the valve body housing 30 which, in turn, permits even further downsizing of the valves, other components and valve body overall.

The valve body housing 30 as previously described, will have internally provided therein, the requisite fluid passageways 142 connecting the threaded ports 44 to the isolation valves 20, fluid passageways 132, 230 connecting the outlet ports of the isolation valves 20 to the threaded outlet ports 46 and to the associated hold/dump valves 22, internal fluid passageways 228 connecting the outlet ports of the hold/dump valves 22 to the low pressure accumulators 24, internal passageways connecting the low pressure accumulators 24 to the pump 26, and internal passageways connecting the outlet of the pump 26 to the attenuator 27 and back to the input of the isolation valves 20 as shown in FIG. 1. The valve body housing 30 will also house the moving components of the hydraulic pump 26, the component parts of the low pressure accumulator 24 and the components of the attenuator as is known in the art.

Valves 20 and 22 mounted in the valve body housing 30 constitute a hydraulic control unit 12 which may be characterized as a "throwaway" modular control unit. If a valve 20 or 22 did not deliver desired results, the control unit 12 can be discarded rather than repaired since the assembly of the valve 20 or 22 is accomplished by swaging, rather than by a valve body threaded into a bore as disclosed in U.S. Pat. No. 4,828,335.

Figure 8:
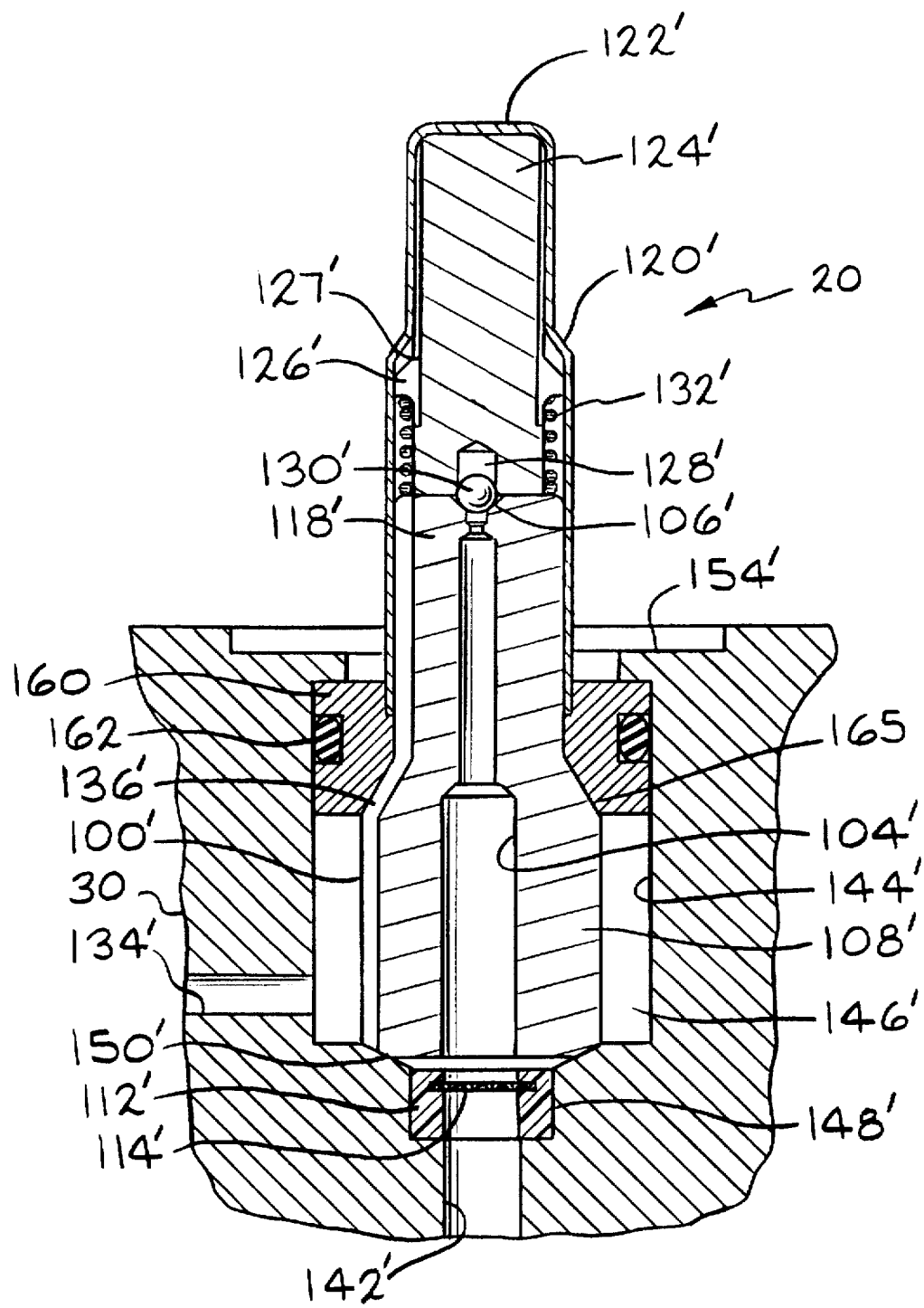
FIG. 8 is a sectional view of a second embodiment of an isolation valve according to the present invention.

A second preferred embodiment of an isolation valve 20' according to this invention and its assembly to the valve body housing 30 is illustrated in FIG. 8. The isolation valve 20' has a cylindrical valve body 100'. The valve body 100' has a coaxial flow passage 104' provided therethrough which terminates at its upper end in a conical valve seat 106'. The lower end of the valve body 100' has an enlarged diameter portion 108'. A filter assembly 112' having a filter 114' is received within a counterbored portion 148' of the valve body housing 30 adjacent inlet passageway 142'. A cylindrical sleeve 120' has an open end and a closed end 122'. The open end is laser welded to an annular retainer ring or collar 160 described below, providing a fluid tight seal therebetween. The valve body 100' has a reduced diameter section 118' over which the open end of the cylindrical sleeve 120' and retainer ring 160 are received. A passageway 136' (only one of which is shown) is in the form of an external trough slot, thereby allowing it to be milled at the outer surface of the valve body 100'. Preferably two or more such passageways 136' will be provided.

An armature 124' is slidably disposed in the cylindrical sleeve 120'. The armature 124' includes an annular flange 126' and an axial bore 128' in which is received a valve member sized to engage the valve seat 106' and block the upper end of the coaxial flow passage 104'. The valve member is preferably a ball 130'. The ball 130' may be a steel ball but preferably is a substantially non-deformable ceramic ball as described earlier. A coil spring 132' is disposed between the upper end of the valve body 100' and the flange 126' and resiliently biases the armature 124' away from the valve body 100', thereby allowing the ball 130' to move away from the valve seat 106'. As stated above, the armature 124' and the flange 126' have trough slots 127' providing a fluid passageway between the flange 126' and the closed end 122' of the cylindrical sleeve 120'. The slots 127' prevent a fluid lock-up condition inhibiting the rapid displacement of the armature 124' relative to the valve body 100'.

A coil assembly (not illustrated) such as previously described coil assembly 40 in FIG. 4 is received over the cylindrical sleeve 120' and is operative, when energized, to produce a magnetic field displacing the armature 124' towards the valve body 100' causing the ball 130' to seat on the valve seat 106'. The seating of the ball 130' on the valve seat 106' terminates the fluid flow between the axial fluid passage 104' and an outlet passageway 134' formed in the valve body housing 30 through the passageways 136' in the valve body 100'. The outlet fluid passageway 134' is connected to an associated threaded aperture 46 and to the input of the associated hold/dump valve 22.

The internal inlet passageway 142' connects to an associated threaded aperture 46, the master cylinder 16, and the output of the pump 26 as shown in FIG. 1.

The valve body housing 30 has a valve cavity 144' for each isolation valve 20' and each hold/dump valve 22 to be mounted therein. The lower or bottom end of the valve cavity 144' has an annular recess 146' provided adjacent to the terminal ends of internal passageways 136' and a counterbore 148' leading into inlet 142'. The counterbore 148' provides a tapered shoulder 150' which provides a stop for the valve body 100'.

The retainer ring 160 with attached sleeve 120' is slidably received over the reduced diameter section 118' of the valve body 100'. The ring 160 includes a compression seal member 162, such as an O-ring, within an annular groove to preclude fluid escaping externally of the cavity 144'. The retainer ring 160 also includes an interior curvilinear, radiused surface 165 mating with an adjacent complementary surface or shoulder on the valve body 100', preferably in the form of a truncated conical surface, providing a secondary fluid seal at this interface during the assembly process described below, as well as serving to hold the valve body 100' on shoulder 150'. Further, at its other end, the internal bore of the retainer ring 160 is counterbored to receive the open end of sleeve 120' prior to being laser welded thereto. Thus, the internal diameter of the sleeve 120' and minimum diameter of the retainer ring 160 are the same and sized to provide a sliding fit with valve portion 118'.

After the valve body 100' is seated on the shoulder 150' and the retainer ring and sleeve assembly 160, 120 is in place, an annular lip 154' of the valve body housing 30 adjacent to the edge of the bore 144' is swaged to form a valve retention lip 154' over the upper surface of the retainer ring 160. The swaged lip 154' locks the valve body 100' in the valve bore 144' of the valve body housing 30 and produces an excellent fluid tight seal at the shoulder 150', thereby precluding fluid flow from inlet passageway 142' to the outlet passageway 134'.

The annular lip 154' may be formed by initially machining an annular groove (not illustrated) in the valve body housing 30 concentric with bore 144'. During assembly, the lip 154' is preferably cone swaged using a swaging tool as taught in U.S. Pat. No. 5,364,067, assigned to the assignee of the present invention hereby referenced as a teaching of the process.

A hold/dump valve such as valve 22 shown in FIG. 7 could be constructed and retained in the valve body housing 30 by a retainer ring 160 in the same manner as valve 20' illustrated in FIG. 8.

Figure 9:
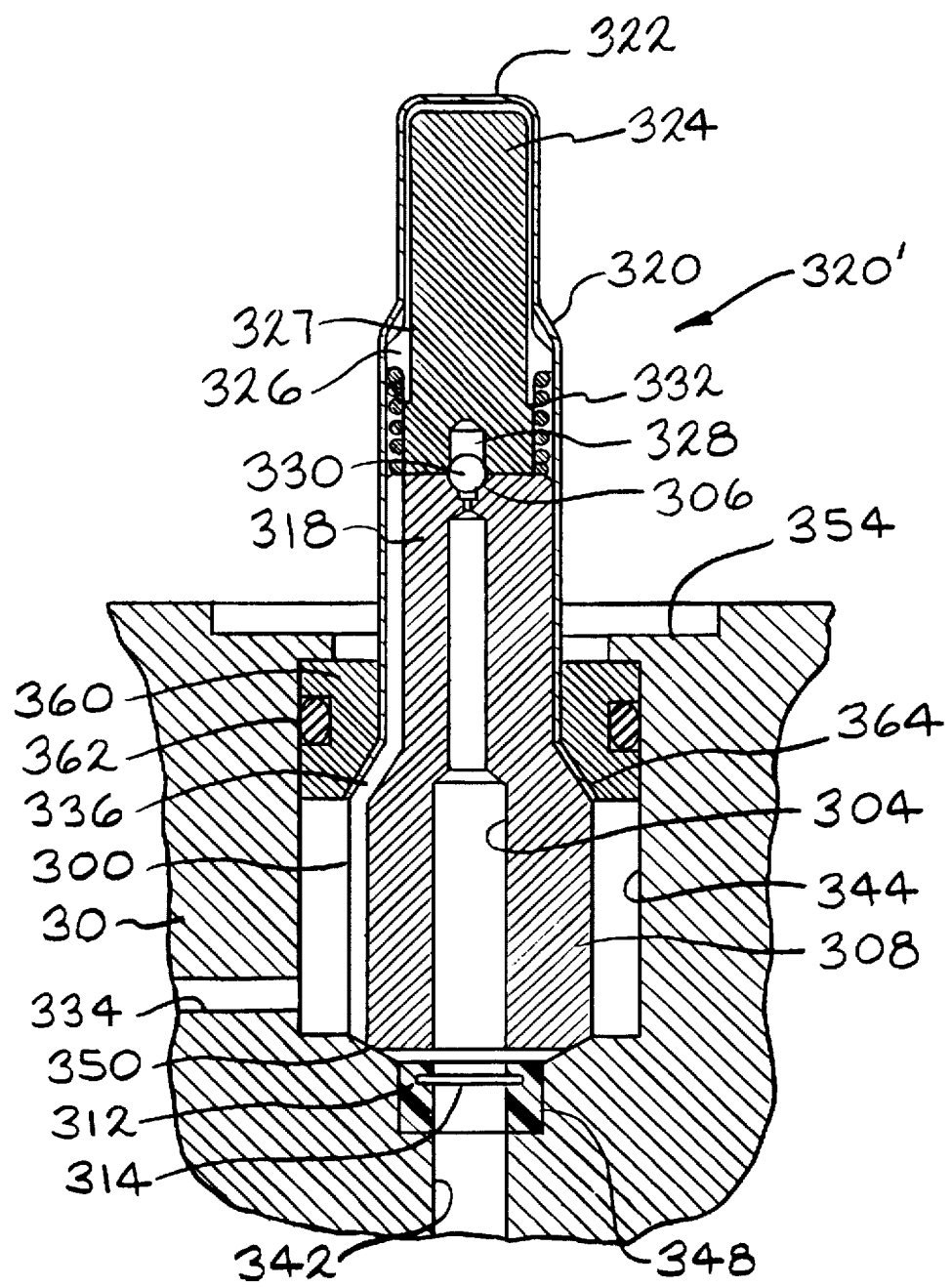
FIG. 9 is a sectional view of a third embodiment of an isolation valve according to the present invention.

A third preferred embodiment of an isolation valve 320' according to this invention and its assembly to the valve body housing 30 is illustrated in FIG. 9. Reference numerals in the 300 series are used for elements of isolation valve 320' corresponding to similar or identical elements present in isolation valve 20' illustrated in FIG. 8. The isolation valve 320' includes a valve body 300, a ball 306 and an armature 324. A sleeve 320 has a closed upper end 322 and open lower end. The lower end of the sleeve 320 extends downwardly between a retainer ring 360 and the valve body 300. Preferably, the sleeve 320 terminates in a beveled portion pressed onto a curvilinear section, preferably formed as a truncated cone, of the valve body 300 formed between a reduced diameter portion 318 and an enlarged diameter portion 308. By pressing the sleeve 320 onto the valve body 300, a weld is not required between the two elements.

After the valve body 300 with the sleeve 320 is inserted into a bore 344, the retaining ring 360 is slid over the sleeve 320 and fitted onto the valve body 300. An annular lip 354 is formed from the material adjacent the bore 344. The lip 354 can be formed by radial swaging, or preferably by cone swaging (not illustrated). If cone swaging is utilized, an annular groove can be formed in the valve body housing 30 prior to the swaging process.

It will be apparent to one skilled in the art that a hold/dump valve 22 can be formed with elements similar to the sleeve 320 and retainer ring 360 used in isolation valve 320'.

Figure 10:
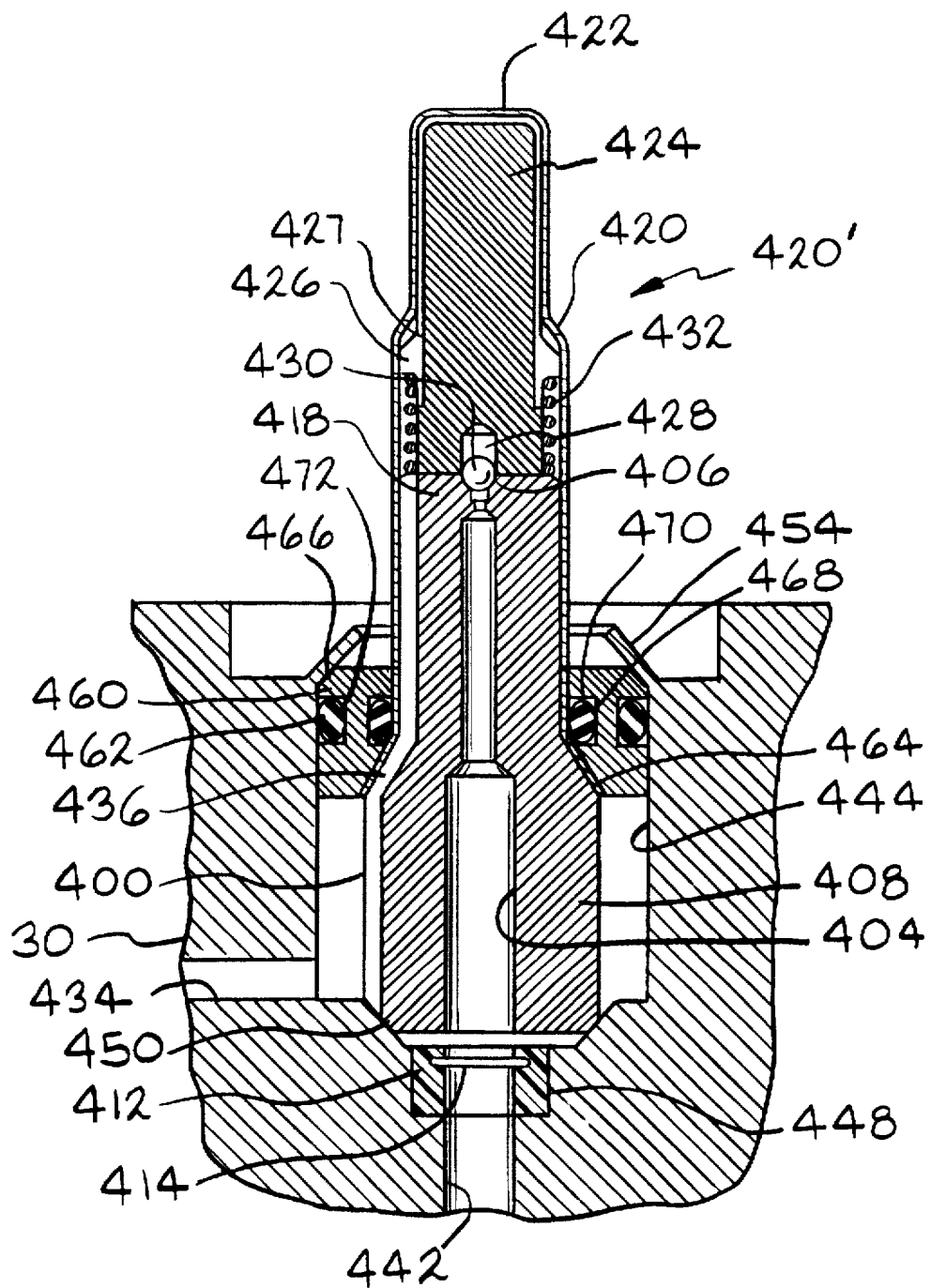
FIG. 10 is a sectional view of a fourth embodiment of an isolation valve according to the present invention.

A fourth preferred embodiment of an isolation valve 420' according to this invention and its assembly to the body housing 30 is illustrated in FIG. 10. Reference numerals in the 400 series are used for elements of isolation valve 420' corresponding to similar or identical elements in isolation valve 320' illustrated in FIG. 9. Isolation valve 420' includes a sleeve 420 terminating in a beveled portion trapped between a retainer ring 460 and a valve body 400. A bevel 466 is formed along the upper outer surface of the retainer ring 460 prior to the swaging process. An annular lip 454 is formed by a cone swaging process which presses against the bevel 466 to trap the retainer ring 460 and provide axial sealing. If desired, an annular groove can be formed in the inner surface of the bore of the retaining ring 460. A seal 470, illustrated as a compressible O-ring, can be received in the groove 468 to provide a seal between the retainer ring 460 and the sleeve 420. If desired, an annular groove 472 can be formed in the outer surface of the retaining ring 460. A seal 462, illustrated as a compressible O-ring, can be received in the groove 472 to provide a seal between the retainer ring 460 and the valve body housing 30.

An angled shoulder 450, preferably at 45 degrees or greater, is provided in the lower counterbore 448 of the valve body housing 30 to provide a relative small area of contact between the valve body housing 30 and the valve body 400. This small area provides a high sealing stress and seal seating.

Figure 11:
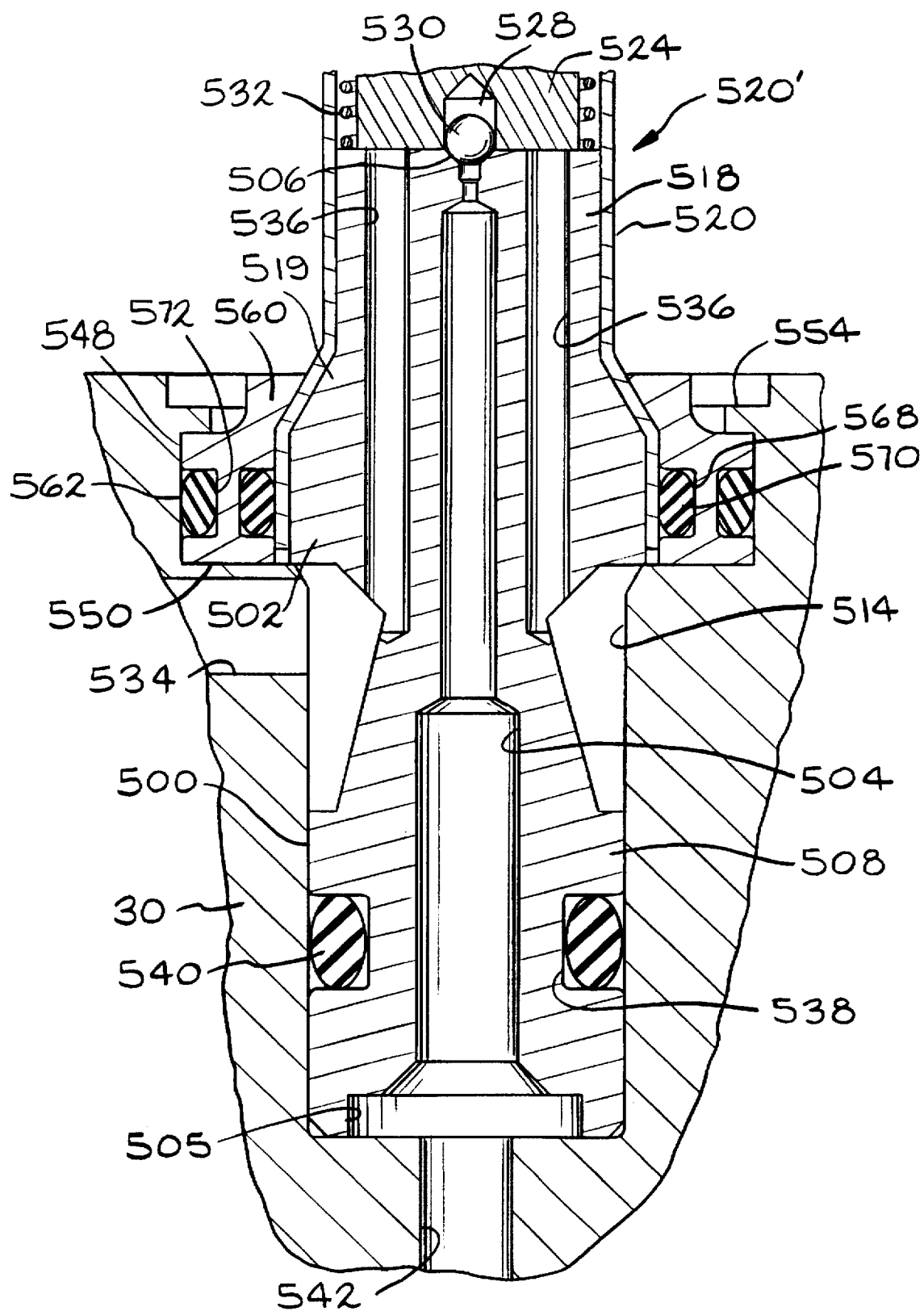
FIG. 11 is a sectional view of a fifth embodiment of an isolation valve according to the present invention.

A fifth preferred embodiment of an isolation valve 520' according to this invention and its assembly to the valve body housing 30 is illustrated in FIG. 11. The isolation valve 520' includes a generally cylindrical valve body 500. The valve body 500 includes a coaxial flow passage 504 provided therethrough which terminates at its upper end in a conical valve seat 506. The coaxial passageway 504 is in fluid communication with a fluid inlet 542 formed in the valve body housing 30. The lower end of the coaxial flow passage 504 may terminate in a counterbore 505. If desired, a fluid filter (not illustrated) can be adapted to the lower end of the coaxial flow passage 504. For example, a filter assembly such as filter assembly 112 for valve body 100 of FIG. 4 can be adapted for the lower end of the valve body 500. In another illustrative example, a filter assembly such as filter assembly 112' and counterbore 148' for valve body 100' of FIG. 8 can be adapted for the valve body housing 30 of FIG. 11.

The valve body 500 includes a lower, enlarged diameter portion 508 and an upper, reduced diameter portion 518. A radial flange 502 is formed between the lower portion 508 and the upper portion 518. Preferably, a plurality of internal fluid passageways 536 are formed through the upper portion 518. The internal passageways 536 are in fluid communication with an outlet port 534 formed in the valve body housing 30.

An annular groove 538 is formed about the circumference of the lower portion 508. A seal 540, illustrated as a compressible O-ring seal, is received in the groove 538 to prevent the flow of fluid from the inlet port 542 to the outlet passageway 534.

The valve body housing 30 has a valve cavity 544 for each isolation valve 520' and each hold/dump valve. A counterbore 548 provides a stepped shoulder 550 which provides a stop for the radial flange 502.

A sleeve 520 has an open end which is fitted over the reduced diameter portion 518 of the valve body 500. The sleeve 520 houses a slidable armature 524 biased by a spring 532 and functions in a manner similar to armature 124 of FIG. 4. A coil assembly 40 (not illustrated in FIG. 11) is placed over the sleeve 520 and energized to slide the armature 524 toward the valve body 500 so that ball 530 moves into the valve seat 506 as shown in FIG. 11 to block fluid to flow from the inlet passage 542 to the outlet passage 134.

Preferably, an angled shoulder 519 in the form of a truncated cone is formed on the outer circumference of the valve body 500 between the reduced diameter portion 518 and the radial flange 502. The lower end of the sleeve 520 is preferably fitted or pressed about the shoulder 519 so that an inner surface of the sleeve 520 is fitted against an outer surface of the flange 502 in a sealing manner. In this manner, the sleeve 520 does not have to be welded to the valve body 500.

A retainer ring or collar 560 is slid over the sleeve 520 and rests on the shoulder 550 of the valve body housing 30. Preferably, an inner surface of the retainer ring 560 is complementary to the outer surface of the sleeve 520. An annular groove 572 is formed in an outer surface of the retainer ring 560. A seal 562, illustrated as a compressible O-ring seal, is fitted in the groove 572 and provides a fluid seal between the valve body housing 30 and the retainer ring 560. A second annular groove 568 is formed in an inner surface of the retainer ring 560. A seal 570, illustrated as a compressible O-ring seal, is fitted in the groove 568 and provides a fluid seal between the sleeve 520 and the retainer ring 560.

After the valve body housing 30 is seated on the shoulder 550 and the retainer ring 560 is in place, a preferably annular lip 554 of the valve body housing 30 adjacent the counterbore 548 is formed over and engages the upper surface of the retainer ring 560. The annular lip 554 secures the retainer ring 560 and valve body 500 in the bore 544 of the valve body housing 30. The annular lip 554 is preferably cone swaged using a swaging tool as described above for the embodiment of FIG. 8. In other embodiments, the lip 554 can be formed by any desirable manner. In yet other embodiments, the lip 554 can be formed as a segmented annular member.

It will be apparent to one skilled in the art that a hold/dump valve 22 can be formed with elements similar to the sleeve 520 and retainer ring 560 used in isolation valve 520'.

Figure 12:
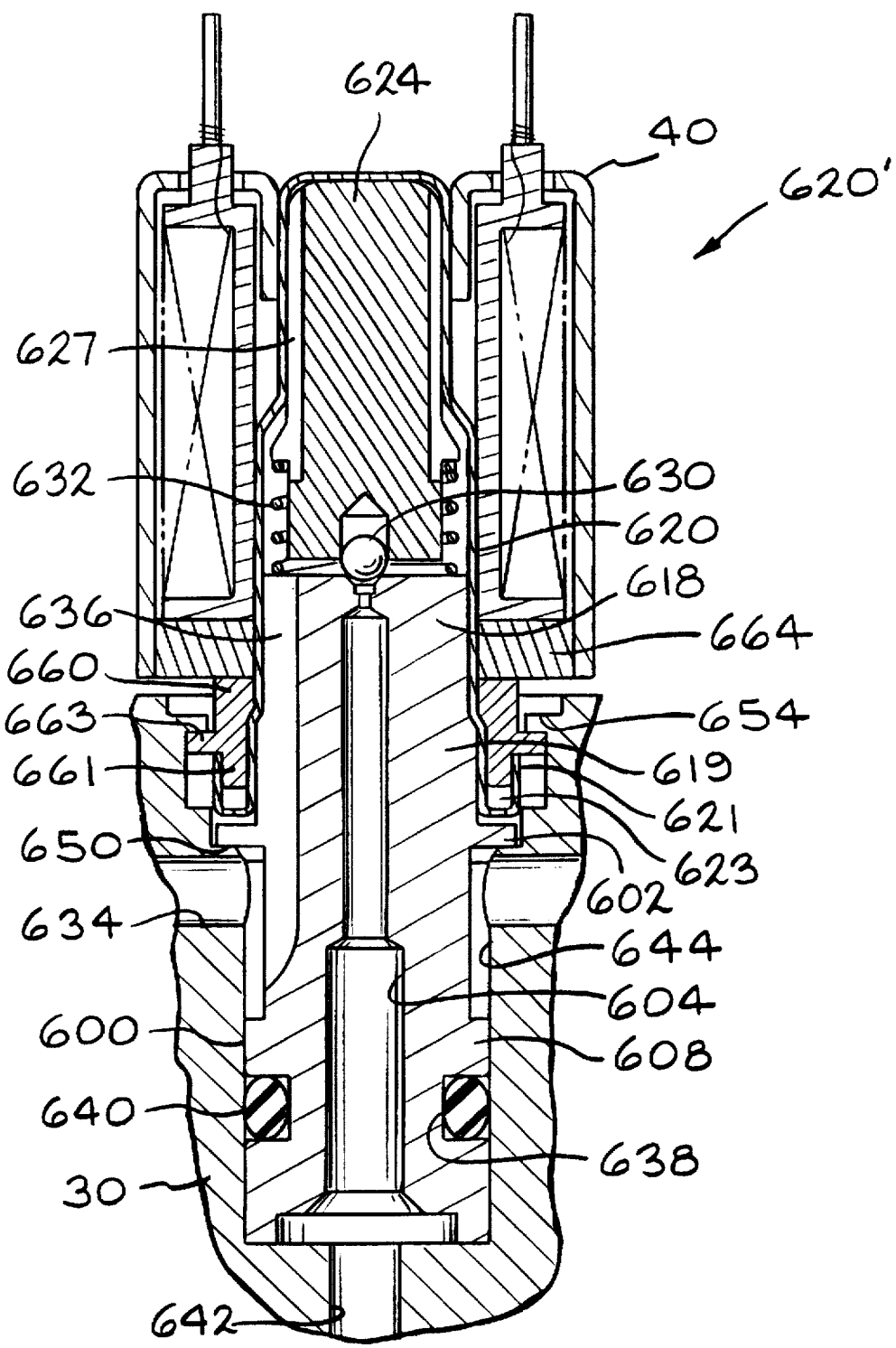
FIG. 12 is a sectional view of a sixth embodiment of an isolation valve according to the present invention.

A sixth preferred embodiment of an isolation valve 620' according to this invention is illustrated in FIG. 12. The isolation valve 620' includes a valve body 600 having a lower portion 608, an upper portion 618 and a radial flange 602 formed between the portions 608, 618. The upper portion 618 includes a stepped portion 619 having a larger diameter. A sleeve 620 is fitted over the upper portion 618 and stepped portion 619 and terminates in an upwardly projecting annular flange 621. A retainer ring or collar 660 includes an annular cylindrical portion 661 having an outer annular radial flange 663. Preferably, a lower portion of the cylindrical portion 661 has thickness which is complementary to and received in an annular gap 623 formed between the annular flange 621 and the sleeve 620.

After the radial flange 602 is seated on the shoulder 650 and the retainer ring 660 has been seated in the gap 623, a preferably annular lip 654 of the valve body housing 30 adjacent the bore 644 is formed over and engages the upper surface of the retainer ring 660. The annular lip 654 secures the retainer ring 660 and valve body 600 in the bore of the valve body housing 30. The annular lip 654 is preferably swaged using a swaging tool as described above for the embodiment of FIG. 4. In other embodiments, the lip 654 can be formed by any desirable manner. In yet other embodiments, the lip 654 can be formed as a segmented annular member.

It will be apparent to one skilled in the art that a hold/dump valve 22 can be formed with elements similar to the sleeve 620 and retainer ring 660 used in isolation valve 620'.

Figure 13:
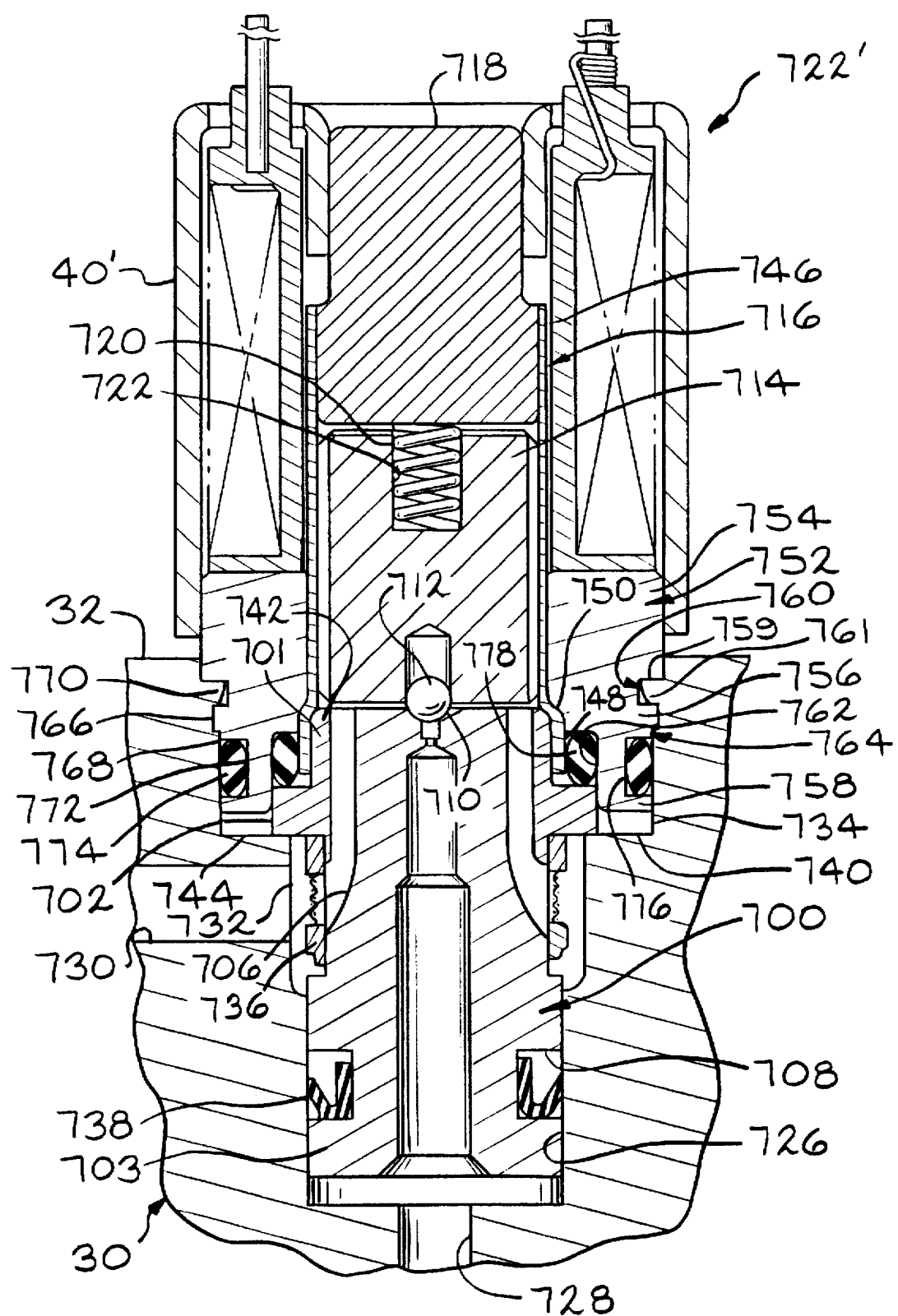
FIG. 13 is a sectional view of a second embodiment of a hold/dump valve according to the present invention.

A second preferred embodiment of a hold/dump valve 722' according to the invention and its assembly to the valve body housing 30 is illustrated in FIG. 13. Reference numerals in the 700 series are used for elements of hold/dump valve 722' corresponding to similar or identical elements present in hold/dump valve 22 illustrated in FIG. 7. The hold/dump valve 722' includes a generally cylindrical valve body 700. The valve body 700 has an upper portion 701, a lower portion 703, and a radial flange 702 formed between the portions 701, 703. The upper portion 701 has a beveled upper edge 742. The valve body 700 also has a coaxial outlet passage 704, and a plurality of inlet passages 706. The coaxial outlet passage 704 has a conical valve seat 710 provided at its upper end. An annular filter 736 is received over the valve body 700 and covers the terminal ends of the inlet passages 706. An annular seal groove 708 is formed in the lower portion 703 of the valve body 700. A one-way seal 738 is disposed in the seal groove 708.

The valve body 700 is mounted in a generally cylindrical valve cavity 726 provided in the valve body housing 30. The valve body housing 30 has an inlet passageway 730 and an outlet passageway 728. The one-way seal 738 prevents a fluid flow from the inlet passageway 730 to the outlet passageway 728. The valve body housing 30 also has an annular recess 732 adjacent to the terminal ends of the inlet passages 706, and a counterbore 734 adjacent to the wall surface 32 of the valve body housing 30. A shoulder 740 is formed at the bottom of the counterbore 734. The radial flange 702 of the valve body 700 has a diameter somewhat larger than the diameter of the annular recess 732, and smaller than the diameter of the counterbore 734. Consequently, the radial flange 702 rests on the shoulder 740 when the valve body 700 is mounted, with an annular space 744 left between the radial flange 702 and the counterbore 734.

The valve seat 710 of the valve body 700 is sealingly engaged by a ball valve 712 attached to an armature 714. The armature 714 is slidably received in a sleeve 716. The sleeve 716 has an upper end 746 which is sealed to a cylindrically-shaped stationary pole piece 718. The sleeve also has an enlarged diameter lower end 748, and a shoulder 750 formed adjacent to the lower end 748. The lower end 748 of the sleeve 716 is fitted or pressed about the upper end of the valve body 700. The shoulder 750 of the sleeve 716 rests on the beveled upper edge 742 of the valve body 700. A coil spring 720 is received in a spring bore 722 provided in the armature 714. The coil spring 720 resiliently biases the armature 714 away from pole piece 718 and biases the ball valve 712 to engage the valve seat 710, thus providing the hold/dump valve 722' with a normally closed state.

The assembly also includes a generally annular flux ring/retainer 752. Preferably, the flux ring/retainer 752 is constructed from a ferrous material, such as steel, which is substantially non-deformable when compared to a housing 30 formed from a deformable material such as aluminum. The flux ring/retainer 752 includes an upper portion 754, a reduced diameter center portion 756, and a lower flange portion 758. A circumferential retention groove 760 is formed between the upper portion 754 and the center portion 756. Preferably, the retention groove 760 extends around the entire circumference of the flux ring/retainer 752. The retention groove has an upper edge 759 and a lower edge 761. The upper edge 759 has a diameter which is larger than the diameter of the lower edge 761, and which is larger than the diameter of the upper end of the counterbore 734.

A shoulder 762 is formed in the inner surface of the flux ring/retainer 752. A stepped edge 764 is formed in the outer surface of the flux ring/retainer 752. The stepped edge 764 includes an upper edge portion 766 and a reduced diameter lower edge portion 768. As will be described below, the stepped edge 764 facilitates the insertion of the flux ring/retainer 752 into the counterbore 734.

During assembly, the flux ring/retainer 752 is slid over the sleeve 716 and pressed down into the counterbore 734. The flange portion 758 and lower edge portion 768 of the flux ring/retainer 752 are press fit into the counterbore 734. However, the upper edge portion 766 has a diameter somewhat larger than the diameter of the counterbore 734. As a result, the surface of the counterbore 734 is deformed slightly outwardly as the upper edge portion 766 is pressed down into the counterbore 734.

The upper edge 759 of the retention groove 760 has an outer diameter which is substantially larger than the diameter of the counterbore 734. As a result, when the upper edge 759 is pressed down into the counterbore 734, the material of the valve body housing 30 around the upper end of the counterbore 734 is crimped or sheared by the upper edge 759. The sheared material is forced into the retention groove 760 of the flux ring/retainer 752 in the form of an annular protrusion 770. The protrusion 770 engages the retention groove 760 to secure the flux ring/retainer 752 inside the counterbore 734. In this manner, the flux ring/retainer 752 is self-clenching to the valve body housing 30.

The shoulder 762 of the flux ring/retainer 752 rests on the shoulder 750 of the sleeve 716, and presses the shoulder 750 against the beveled upper edge 742 of the valve body 700. The lower end 748 of the sleeve 716 is pressed about the upper end of the valve body 700 in a sealing manner. Accordingly, the sleeve 716 does not have to be welded to the valve body 700. The flux ring/retainer 752 functions as a retaining ring to secure the sleeve 716 to the valve body 700, and to secure the valve body 700 to the valve body housing 30.

The flange portion 758 of the flux ring/retainer 752 is sized to be slightly larger than the annular space 744 between the counterbore 734 and the radial flange 702 of the valve body 700. Consequently, the flange portion 758 fits between the counterbore 734 and the radial flange 702 in a press fit relationship to provide a solid attachment between the valve body 700 and the valve body housing 30. An annular first seal groove 772 is formed in the outer surface of the flange portion 758. A seal 774, illustrated as a compressible O-ring seal, is fitted in the first seal groove 772 and provides a fluid seal between the flux ring/retainer 752 and the valve body housing 30. An annular second seal groove 776 is formed in the inner surface of the flange portion 758. A seal 778 is fitted in the second seal groove 776 and provides a fluid seal between the flux ring/retainer 752 and the sleeve 716.

A solenoid coil assembly 40', similar to the solenoid coil assembly 40 shown in FIG. 2, is slidably received over the pole piece 718, the sleeve 716 and the flux ring/retainer 752. The coil assembly 40' is operative, when energized, to generate a magnetic field displacing the armature 714 in a direction towards the pole piece 718. This disengages the ball valve 712 from the valve seat 710, thus opening a fluid passage between the inlet passages 706 and the coaxial outlet passage 704. The flux ring/retainer 752 enhances the strength of the magnetic field in the vicinity of the armature 714.

It will be apparent to one skilled in the art that an isolation valve 20 can be formed with elements similar to the flux ring/retainer 752 used in hold/dump valve 722'.

Figure 14:
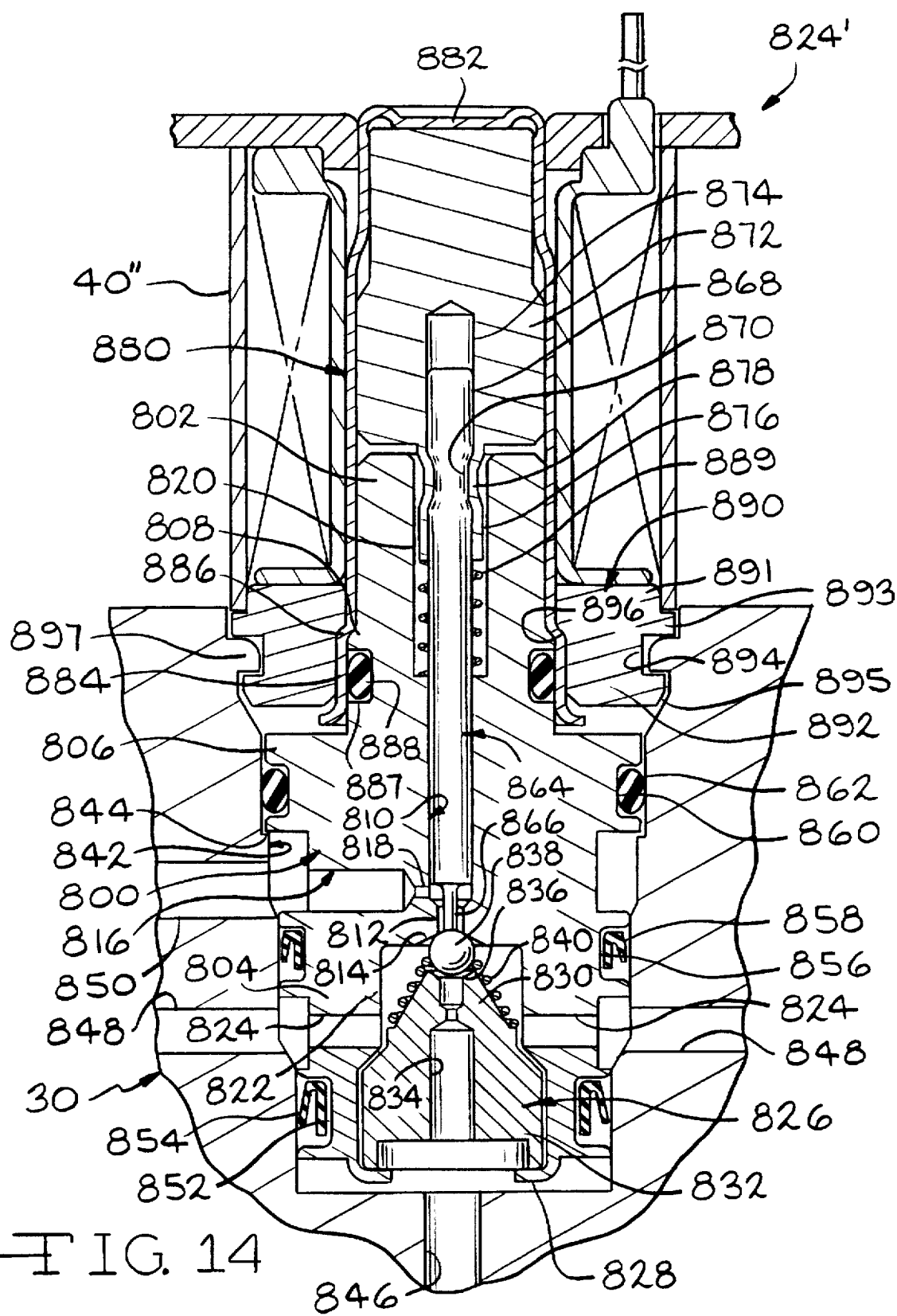
FIG. 14 is a sectional view of a three-way valve according to the present invention.

A preferred embodiment of a three-way valve 824' according to the invention and its assembly to the valve body housing 30 is illustrated in FIG. 14. As will be described below, the three-way valve 824' functions both as an isolation valve and a hold/dump valve. Consequently, the total number of valves in the hydraulic control unit can be reduced. This allows construction of a hydraulic control unit having reduced size and weight. The three-way valve 824' has a generally cylindrical valve body 800. The valve body 800 includes a reduced diameter upper portion 802, a lower portion 804, and a radial flange 806 between portions 802, 804. The upper portion has an annular shoulder 808.

An axial bore 810 is formed through the center of the valve body 800. The axial bore 810 has a reduced diameter lower end 812 which terminates in a conical first valve seat 814. A low pressure accumulator outlet passage 816 is formed between the axial bore 810 and the outer surface of the valve body 800. The outlet passage 816 has an inner end 818 which terminates adjacent to the lower end 812 of the axial bore 810. An axial counterbore 820 is formed through the upper portion 802 of the valve body 800, and a coaxial counterbore 822 is formed through the lower portion 804. A pair of brake outlet passages 824 are formed between the coaxial counterbore 822 and the outer surface of the valve body 800.

A valve insert 826 is disposed inside the coaxial counterbore 822 and secured to the valve body 800 by an annular flange 828. The valve insert 826 has a generally conical upper portion 830 and a generally cylindrical lower portion 832. An axial inlet passage 834 is formed through the valve insert 826 and terminates at its upper end in a conical second valve seat 836. A ball valve 838 is disposed between the first valve seat 814 and the second valve seat 836, with a small clearance therebetween for the ball valve 838 to move up and down between the valve seats 814, 836. A coil spring 840 is mounted on the upper portion 830 of the valve insert 826 to resiliently bias the ball valve 838 away from the second valve seat 836 and against the first valve seat 814.

The valve body 800 is mounted in a generally cylindrical valve cavity 842 provided in the valve body housing 30. The radial flange 806 of the valve body 800 rests on a shoulder 844 formed in the valve cavity 842. The valve body housing 30 has an inlet passageway 846 which connects the valve cavity 842 to an associated aperture 44 (FIG. 2) and to the master cylinder 16 (FIG. 1). The inlet passageway 846 is connected to the inlet passage 834 of the valve body 800. The valve body housing 30 also has brake outlet passageways 848 which connect the valve cavity 842 to associated apertures 46 (FIG. 2) and to a pair of slave cylinders 18 for brakes 28 (FIG. 1). The brake outlet passageways 848 are connected to the brake outlet passages 824 of the valve body 800. Further, the valve body housing 30 has a low pressure accumulator outlet passageway 850 which connects the valve cavity 842 to an associated end cap 48 (FIG. 2) and to the low pressure accumulator 24 (FIG. 1). The low pressure accumulator outlet passageway 850 is connected to the low pressure accumulator outlet passage 816 of the valve body 800.

An annular first groove 852 is formed in the surface of the lower end of the valve body 800. A one-way seal 854 is positioned in the first groove 852 to prevent a fluid flow from the inlet passageway 846 to the brake outlet passageways 848. An annular second groove 856 is also formed in the surface of the lower portion 804 of the valve body 800. A one-way seal 858 is positioned in the second groove 856 to prevent a fluid flow from the brake outlet passageways 848 to the low pressure accumulator outlet passageway 850. The radial flange 806 of the valve body 800 has an annular seal groove 860 in which is received a compressible O-ring seal 862 to provide a fluid seal between the radial flange 806 and the valve body housing 30.

A generally cylindrical pin 864 is slidably disposed inside the axial bore 810 of the valve body 800. The pin 864 has a reduced diameter tip 866 disposed inside the reduced diameter lower end 812 of the axial bore 810, with a small clearance therebetween. The tip 866 of the pin 864 engages the ball valve 838. The pin 864 also has an upper portion 868 including a necked-in portion 870. The upper portion 868 of the pin 864 is attached to an armature 872. The armature 872 has an axial bore 874 and a generally cylindrical flange 876 coaxial with the bore 874. The flange 876 includes a necked-in portion 878. The upper portion 868 of the pin 864 is received inside the axial bore 874 and flange 876 of the armature 872, with the necked-in portion 878 of the flange 876 engaging the necked-in portion 870 of the pin 864 for attachment.

The armature 872 is slidably received in a sleeve 880. The sleeve 880 has a closed upper end 882, an enlarged diameter lower end 884, and a shoulder 886 formed adjacent to the lower end 884. The lower end 884 of the sleeve 880 is fitted or pressed about the upper portion 802 of the valve body 800, with the shoulder 886 of the sleeve 880 resting on the shoulder 808 of the valve body 800. An annular seal groove 887 is formed in the outer surface of the upper portion 802 of the valve body 800. A compressible O-ring seal 888 is fitted in the seal groove 887 and provides a fluid seal between the valve body 800 and the sleeve 880.

A coil spring 889 is received in the axial counterbore 820 of the valve body 800. The coil spring 889 resiliently biases the armature 872 and the attached pin 864 upward relative to the valve body 800. The tip 866 of the pin 864 is biased upward relative to the ball valve 838. The coil spring 840 attached to the valve insert 826 resiliently biases the ball valve 838 upward to engage the first valve seat 814, and away from the second valve seat 836. Thus, in the unenergized state, the three-way valve 824' allows fluid to flow from the inlet passage 834 (connected to the master cylinder) to the brake outlet passages 824 (connected to the slave cylinders of the brakes). Fluid flow is blocked to the low pressure accumulator outlet passage 816 (connected to the low pressure accumulator).

The assembly also includes a generally annular flux ring/retainer 890. Preferably, the flux ring/retainer 890 is constructed from a ferrous material, such as steel. The flux ring/retainer 890 includes an upper portion 891, a lower portion 892, and a radial flange 893 between the portions 891, 892. An annular retention groove 894 is formed in the lower portion 892 adjacent to the radial flange 893. The lower portion 892 has a beveled outer edge 895. The inner diameter of the upper portion 891 is somewhat smaller than the inner diameter of the lower portion 892, so that a shoulder 896 is formed in the inner surface of the flux ring/retainer 890.

During assembly, the flux ring/retainer 890 is slid over the sleeve 880 and pressed down into the upper end of the valve cavity 842. The lower portion 892 of the flux ring/retainer 890 is press fit into the valve cavity 842. However, the radial flange 893 of the flux ring/retainer 890 has an outer diameter which is substantially larger than the diameter of the valve cavity 842. As a result, when the radial flange 893 is pressed down into the valve cavity 842, the material of the valve body housing 30 around the upper end of the valve cavity 842 is crimped or sheared by the radial flange 893. The sheared material is forced into the annular retention groove 894 of the flux ring/retainer 890 in the form of an annular protrusion 897. The protrusion 897 engages the retention groove 894 to secure the flux ring/retainer 890 inside the valve cavity 842. In this manner, the flux ring/retainer 890 is self-clenching to the valve body housing 30.

The shoulder 896 of the flux ring/retainer 890 rests on the shoulder 886 of the sleeve 880, and presses the shoulder 886 against the shoulder 808 of the valve body 800. The lower end 884 of the sleeve 880 is pressed about the upper portion 802 of the valve body 800 in a sealing manner. Accordingly, the sleeve 880 does not have to be welded to the valve body 800. The flux ring/retainer 890 functions as a retaining ring to secure the sleeve 880 to the valve body 800, and to secure the valve body 800 to the valve body housing 30. The flux ring/retainer 890 fits between the valve cavity 842 and the sleeve 880 in a press fit relationship to provide a solid attachment between the valve body 800 and the valve body housing 30.

A solenoid coil assembly 40", similar to the solenoid coil assembly 40 shown in FIG. 2, is slidably received over the armature 872 and the flux ring/retainer 890. The coil assembly 40" is operative, when energized, to generate a magnetic field displacing the armature 872 in a downward direction toward the valve body 800. The pin 864 attached to the armature 872 is displaced downward inside the axial bore 810 of the valve body 800. The tip 866 of the pin 864 urges the ball valve 838 downward to engage the second valve seat 836. This blocks the flow of fluid from the inlet passage 834 (connected to the master cylinder) to the brake outlet passages 824 (connected to the slave cylinders of the brakes). However, the ball valve 838 is disengaged from the first valve seat 814, opening a fluid passage into the lower end 812 of the axial bore 810. The reduced diameter tip 866 of the pin 864 is long enough to allow fluid to flow through the axial bore 810 to the low pressure accumulator outlet passage 816 (connected to the low pressure accumulator). Thus, in the energized state, the three-way valve 824' allows fluid to flow from the slave cylinders of the brakes to the low pressure accumulator. The three-way valve 824' can be pulsed with modulation to control the fluid pressure at the brakes.

It will be apparent to one skilled in the art that an isolation valve 20 and a hold/dump valve 22 can be formed with elements similar to the flux ring/retainer 890 used in three-way valve 824'.

Figure 15:
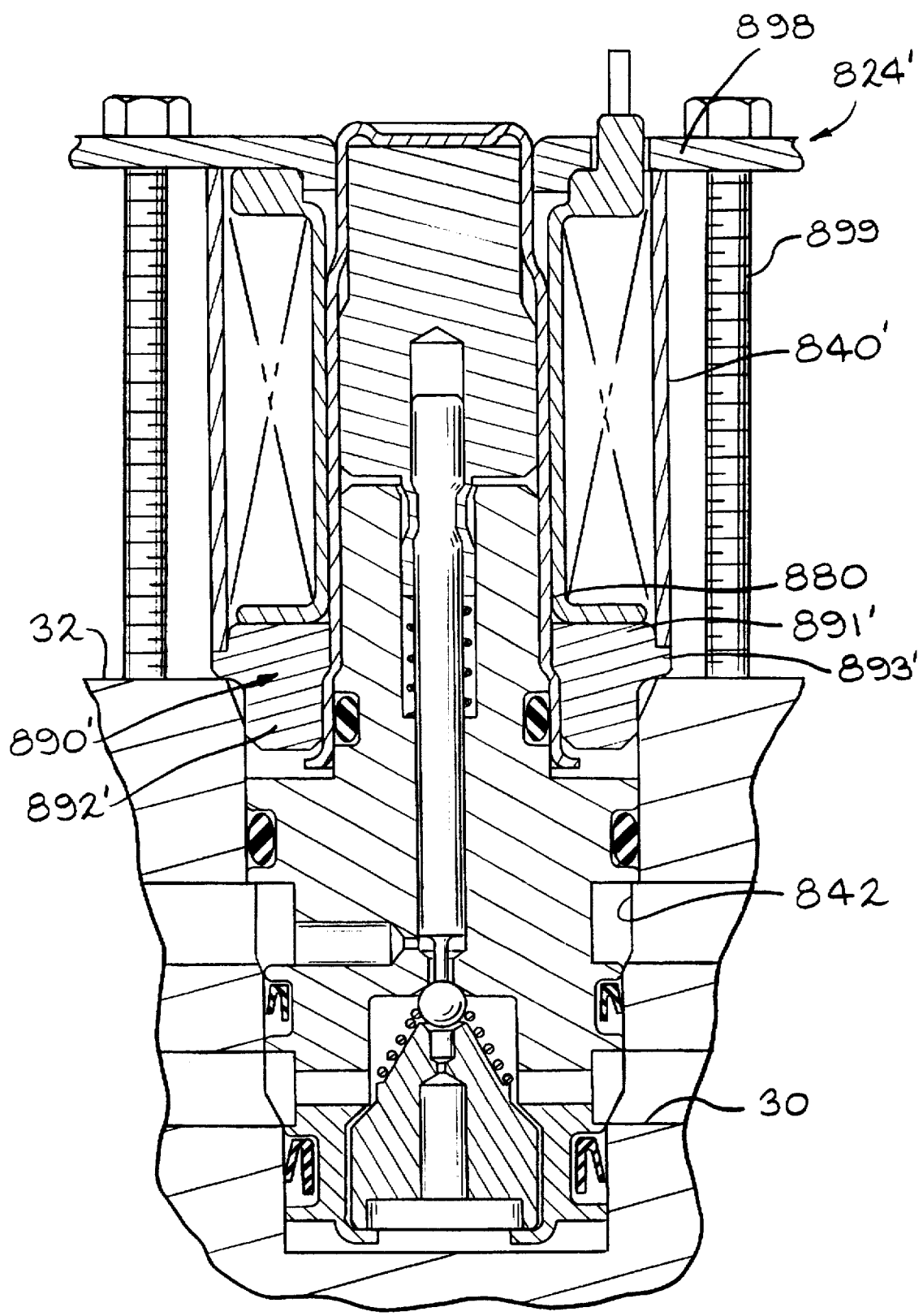
FIG. 15 is a partial sectional view of a second embodiment of a three-way valve according to the present invention.

FIG. 15 shows an alternate embodiment of a means for retaining the three-way valve 824' inside the valve cavity 842 of the valve body housing 30. The assembly includes a generally annular flux ring/retainer 890'. The flux ring/retainer 890' includes an upper portion 891', a lower portion 892', and a radial flange 893' between the portions 891', 892'. The lower portion 892' of the flux ring/retainer 890' is press fit between the sleeve 880 and the upper end of the valve cavity 842. The radial flange 893' of the flux ring/retainer 890' rests on the wall surface 32 around the valve cavity 842. A coil assembly 840' rests on the upper portion 891' and radial flange 893' of the flux ring/retainer 890'. A top plate 898 rests on the upper end of the coil assembly 840'. Fasteners such as rivets or bolts 899 are connected between the top plate 898 and the valve body housing 30 to secure the coil assembly 840', flux ring/retainer 890' and valve body 800 to the valve body housing 30. In another embodiment (not shown), fasteners are used to directly secure the flux ring/retainer 890' to the valve body housing 30.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A hydraulic valve control unit comprising:
   a valve body having an inner end, an outer end, and a fluid passageway;
   a housing having a bore receiving the inner end of the valve body, the bore having an inner end and an outer end;
   a sleeve having an open end placed over the outer end of the valve body;
   an armature slideably mounted in the sleeve;
   a coil surrounding the sleeve for selectively moving the armature;
   a flux ring disposed between the coil, housing and sleeve, the flux ring securing the sleeve to the valve body, and the flux ring having a circumferential retention groove; and
   a protrusion formed from the housing when the flux ring is pressed into the housing bore, the protrusion engaging the retention groove to secure the flux ring, sleeve and valve body to the housing.

2. The hydraulic control unit of claim 1 wherein the retention groove of the flux ring has an inner edge and an outer edge, and the outer edge has a diameter which is larger than a diameter of the inner edge and larger than a diameter of the outer end of the bore.

3. The hydraulic control unit of claim 1 wherein the flux ring is disposed between the housing and the sleeve in an interference fit.

4. The hydraulic control unit of claim 1 wherein the flux ring has a shoulder which engages a shoulder of the sleeve to secure the sleeve to the valve body.

5. The hydraulic control unit of claim 1 wherein the flux ring has a stepped edge to facilitate its insertion into the bore of the housing.

6. The hydraulic control unit of claim 1 wherein the flux ring has a beveled edge to facilitate its insertion into the bore of the housing.

7. The hydraulic control unit of claim 1 wherein the valve body has a radial flange which is seated on a shoulder inside the bore.

8. The hydraulic control unit of claim 7 wherein the flux ring has a flange which is disposed between the bore and the radial flange of the valve body in an interference fit.

9. The hydraulic control unit of claim 1 wherein the housing is formed from a deformable material, and the flux ring is formed from a substantially non-deformable material.

10. The hydraulic control unit of claim 1 wherein the valve body comprises an isolation valve having a normally open state and switchable to a closed state in response to the displacement of the armature.

11. The hydraulic control unit of claim 1 wherein the valve body comprises a hold/dump valve having a normally closed state and switchable to an open state in response to the displacement of the armature.

12. The hydraulic control unit of claim 1 wherein the valve body comprises a three-way valve having a first state allowing fluid to flow between a first passage and a second passage, and switchable in response to the displacement of the armature to a second state allowing fluid to flow between the second passage and a third passage.

13. A method of assembling a hydraulic valve control unit comprising:
   forming a bore in a housing;
   inserting an inner end of a valve body into the bore;
   placing a sleeve over an outer end of the valve body;
   pressing a flux ring between the sleeve and the bore, the flux ring having a circumferential retention groove with an outer edge having a diameter which is larger than a diameter of the bore; and
   shearing material from the housing around the bore with the outer edge of the flux ring to form a protrusion which engages the retention groove and secures the flux ring, sleeve and valve body to the housing.

14. The method of claim 13 wherein the housing is formed from a deformable material and the flux ring is formed from a substantially non-deformable material.

15. The method of claim 13 comprising the additional steps of slideably mounting an armature in the sleeve, and positioning a coil around the sleeve for selectively moving the armature.

16. A hydraulic valve control unit comprising:
   a valve body having an inner end, an outer end, and a fluid passageway;
   a housing having a bore receiving the inner end of the valve body;
   a sleeve having an open end placed over the outer end of the valve body;
   an armature slideably mounted in the sleeve;
   a coil surrounding the sleeve for selectively moving the armature;
   a flux ring disposed between the coil, housing and sleeve, the flux ring extending into the housing bore and securing the sleeve to the valve body so that the sleeve is not welded to the valve body.

17. The hydraulic control unit of claim 16 wherein the sleeve is pressed about the valve body in a sealing manner.

18. The hydraulic control unit of claim 17 wherein the flux ring presses a shoulder of the sleeve against the valve body.

19. The hydraulic control unit of claim 16 wherein the flux ring is disposed between the sleeve and the housing in an interference fit.

20. The hydraulic control unit of claim 16 wherein the flux ring has a radial flange which is seated on an outer surface of the housing.

* * * * *